US008229933B2

(12) United States Patent
Fontoura et al.

(10) Patent No.: US 8,229,933 B2

(45) Date of Patent: Jul. 24, 2012

(54) SYSTEM AND METHOD FOR AUTOMATIC MATCHING OF CONTRACTS USING A FIXED-LENGTH PREDICATE REPRESENTATION

(75) Inventors: Marcus Fontoura, Mountain View, CA (US); Suhas Sadanandan, Sunnyvale, CA (US); Jayavel Shanmugasundaram, Santa Clara, CA (US); Sergei Vassilvitskii, New York, NY (US); Erik Vee, San Mateo, CA (US); Srihari Venkatesan, Sunnyvale, CA (US); Jason Zien, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 238 days.

(21) Appl. No.: 12/714,142

(22) Filed: Feb. 26, 2010

(65) Prior Publication Data

US 2011/0213767 A1 Sep. 1, 2011

(51) Int. Cl.
*G06F 7/00* (2006.01)

(52) U.S. Cl. ........................................ 707/741; 707/797

(58) Field of Classification Search .................. 707/778, 707/742, 797, 705, 741; 705/14.72
See application file for complete search history.

(56) References Cited

U.S. PATENT DOCUMENTS

2010/0042930 A1* 2/2010 Pritchard et al. .............. 715/738
2010/0257054 A1* 10/2010 Martin et al. .............. 705/14.46

* cited by examiner

*Primary Examiner* — Amy Ng
(74) *Attorney, Agent, or Firm* — Stattler—Suh PC

(57) ABSTRACT

An item of inventory is described as a Boolean expression, which is converted into a multi-level, alternating AND/OR impression tree representation with leaf nodes representing conjuncts. Processing the conjuncts of the tree through a contract index results in retrieving a set of candidate contracts that match at least some but not necessarily all impression tree leaf node predicates. Next, an AND/OR contract tree representation is constructed with each contract tree leaf node having a label representing a projection onto a discrete set of ordered symbols. Contracts with projections that cover the entire range of discrete set of ordered symbols are deemed to satisfy the item of inventory. Implementation of the contract index includes retrieval techniques to support multi-valued predicates as well as confidence threshold functions using a multi-level tree representation of multi-valued predicates.

20 Claims, 28 Drawing Sheets

2A00

2A10

| History of Hits (January 2007 actual) | Number of Visitors ($P_0$) | From New York ($P_1$) | From California ($P_2$) | Male ($P_3$) |
|---|---|---|---|---|
| EmpireState.com | 10,000 | 5,000 | 5,000 | 5,300 |
| EmpireState.com/hotels | 9,000 | 8,000 | — | 4,000 |

FIG. 2A

SYSTEM AND METHOD FOR AUTOMATIC MATCHING OF CONTRACTS USING A FIXED-LENGTH PREDICATE REPRESENTATION

FIELD OF THE INVENTION

The present invention is directed towards management of on-line advertising contracts based on targeting.

BACKGROUND OF THE INVENTION

The marketing of products and services online over the Internet through advertisements is big business. Advertising over the Internet seeks to reach individuals within a target set having very specific demographics (e.g. male, age 40-48, graduate of Stanford, living in California or New York, etc). This targeting of very specific demographics is in significant contrast to print and television advertisement that is generally capable only to reach an audience within some broad, general demographics (e.g. living in the vicinity of Los Angeles, or living in the vicinity of New York City, etc). The single appearance of an advertisement on a webpage is known as an online advertisement impression. Each time a webpage is requested by a user via the Internet represents an impression opportunity to display an advertisement in some portion of the webpage to the individual Internet user.

Some advertisers enter into contracts with an ad serving company (or publisher) to receive impressions. An advertiser may specify desired targeting criteria. For example, an advertiser may enter into a guaranteed delivery contract with the ad serving company, and the ad serving company may agree to post 2,000,000 impressions over thirty days for US$15,000. In some cases, an advertiser will choose to enter into a non-guaranteed contract with the ad server company and only pay for those impressions actually made by the ad serving company on their behalf. Of course, in modern Internet advertising systems, the competition among advertisers for placement of impressions under non-guaranteed contracts is often resolved by an auction, and the winning bidder's advertisements are shown in the available spaces of the impression.

Online advertising and marketing campaigns often rely, at least partially, on a process where any number of advertisers book contracts with the intention to reach users who satisfy some particular targeting criteria (e.g. male, age 40-48, graduate of Stanford, living in California or New York, etc). Matching a contract to a user can be thought of as a market function, where a user visit is a unit of supply, and a contract is a unit of demand. The market is served by matching supply to demand (or demand to supply). The matching of supply to demand applies to contextual advertising (e.g. text and graphical ads that match a page context and user impression) as well as to sponsored search advertising (e.g. ads that match with search engine queries and results). Various degrees of matching may occur when a user's attribute is matched against an advertiser's targeting criteria.

Considering that (1) the actual existence of a webpage impression opportunity suited for displaying an advertisement is not known until the user clicks on a link pointing to the subject webpage, and (2) that the matching process for selecting advertisements must complete before the webpage is actually displayed, it then becomes clear that the process of assembling competing contracts, completing the matching, and compositing the webpage with the advertiser's ads must start and complete within a matter of fractions of a second. Thus, a system that rapidly matches contracts to opportunities is needed.

Other automated features and advantages of the present invention will be apparent from the accompanying drawings, and from the detailed description that follows below.

SUMMARY OF THE INVENTION

A method for matching of contracts using a fixed-length complex predicate representation for evaluation by projecting TRUE nodes onto a discrete set of symbols. A computer-implemented method comprises storing (in a computer memory), an impression opportunity profile in the form of a Boolean expression and converting such an impression opportunity profile into a conjunct-level representation of impression conjuncts (e.g. a list). The method includes steps for retrieving a set of candidate contracts that match impression conjuncts, and constructing an AND/OR contract tree representation of contracts from among the set of candidate contracts, the AND/OR contract tree comprising a plurality of nodes representing contract tree leaf node predicates, with each contract tree leaf node predicate having a fixed-length label representing a projection onto a discrete set of ordered symbols. Contract tree leaf node predicates are evaluated against the list of impression conjuncts and, based on a comparison (e.g. a threshold comparison, a multi-value comparison, etc.), matching contract tree leaf node predicates are marked as TRUE. The desired results (i.e. identifying satisfying contracts that match the impression) are obtained by projecting the label assigned to the TRUE/marked contract tree leaf node predicates over the discrete set of ordered symbols. The satisfying contracts are those where the projecting operation results in a contiguous projection of the fixed-length label over the discrete set of ordered symbols.

BRIEF DESCRIPTION OF THE DRAWINGS

The novel features of the invention are set forth in the appended claims. However, for purpose of explanation, several embodiments of the invention are set forth in the following figures.

FIG. 2A is a depiction of a two-dimensional table of inventory, according to one embodiment.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

Section I: General Terms and Network Environment

Figure 1A:
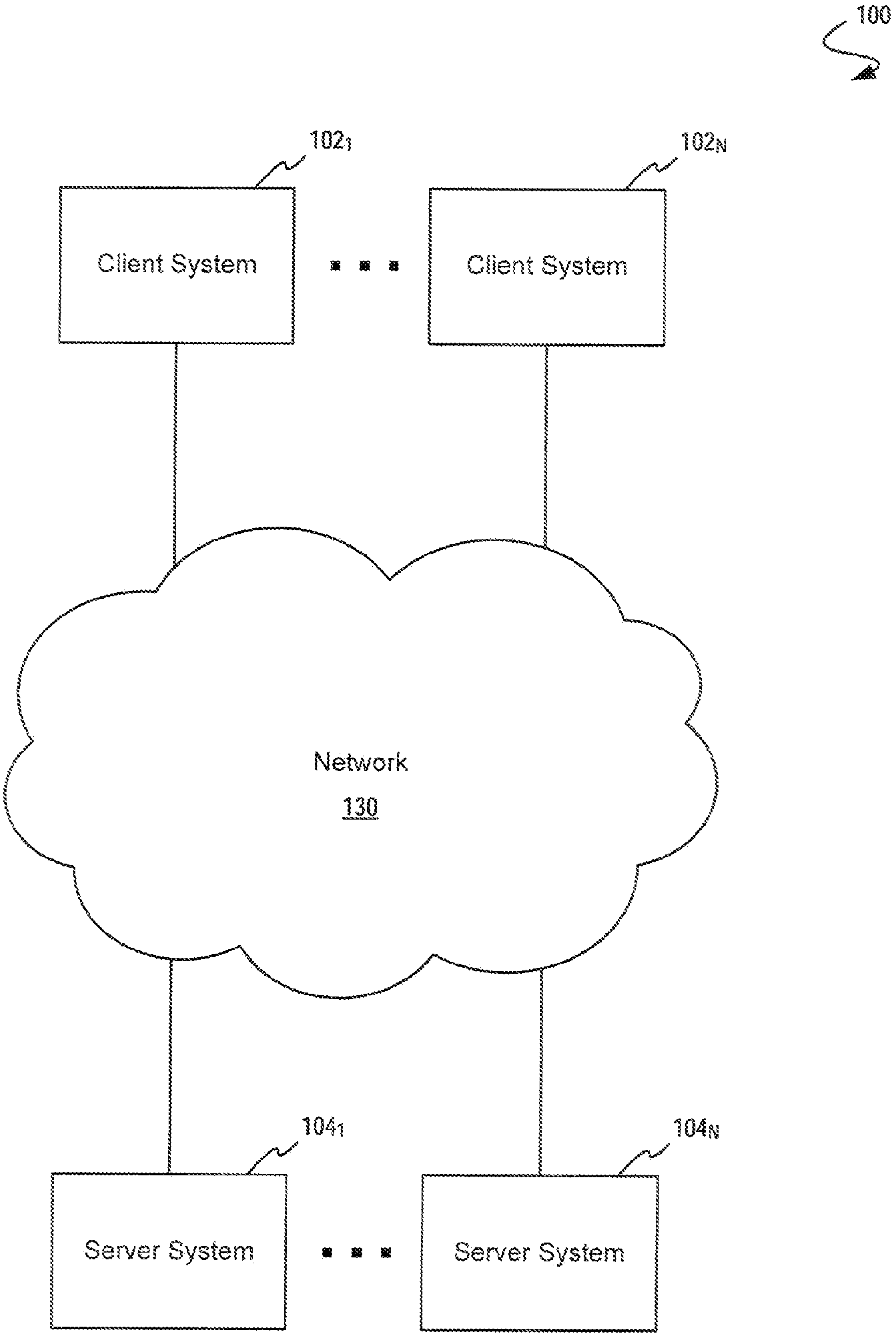
FIG. 1A shows an ad network environment in which some embodiments operate.

In the context of Internet advertising, bidding for placement of advertisements within an Internet environment (e.g. system 100 of FIG. 1A) has become common. By way of a simplified description, an Internet advertiser may select a particular property (e.g. the landing page for the Empire State, empirestate.com), and may create an advertisement such that whenever any Internet user, via a client system $\mathbf{102}_1$-$\mathbf{102}_N$ renders the webpage from empirestate.com, the advertisement is composited on a webpage by a server $\mathbf{104}_1$-$\mathbf{104}_N$ for delivery to a client system 102 over a network 130. This delivery model, as described, does not take into account any explicit demographics of the Internet user, nor does it take into account any explicit demographics sought be the Internet advertiser.

Figure 1B:
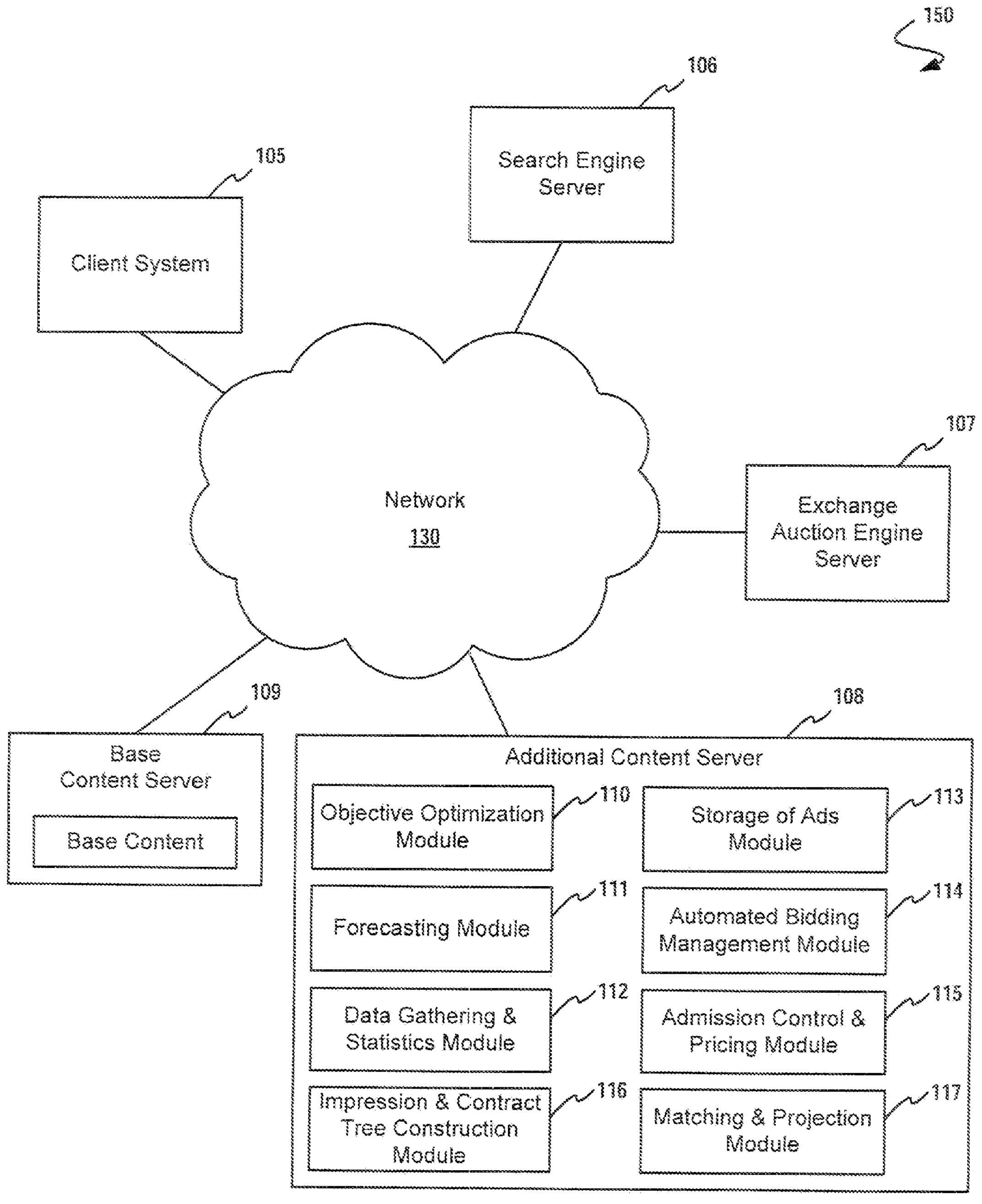
FIG. 1B shows an ad server network environment including an auction engine server in which some embodiments operate.

In the slightly more sophisticated model of FIG. 1B, referring to system 150, and considering only Internet advertising, an Internet property (e.g. empirestate.com) hosted on a content server 109, might measure 10,000 hits in a given month. It also might be able to measure that of those 10,000 hits, 5000 of those hits originated from client systems 105 located in California. It might further be able to measure that of the 10,000 hits from California, 5300 of those were from individuals who identified themselves as male. Still further, the Internet property might be able to measure the number of visitors to empirestate.com who traversed to a sub-page, say empirestate.com/hotels, or the Internet property might be able to measure the number of visitors that arrived at the empirestate.com domain based on a referral from a search engine server 106. Still further, an Internet property might be able to measure the number of visitors that have any arbitrary characteristic, demographic or attribute, possibly using an additional content server 108 in conjunction with a data gathering and statistics module 112. Thus, an Internet user might be 'known' in quite some detail as pertains to a wide range of demographics or other attributes.

Therefore, multiple competing advertisers might elect to hid in a market (e.g. an exchange) via an exchange server or auction engine 107 in order to win the most prominent spot, or an advertiser might enter into a contract (e.g. with the Internet property, or with an advertising agency, or with an advertising network, etc) to purchase the desired spots for some time duration (e.g. all top spots in all impressions of the webpage empirestate.com/hotels for all of 2010). Such an arrangement and variants as used here is termed a contract.

In embodiments of the system 150, components of the additional content server, perform processing such that, given an ad opportunity (e.g. an impression opportunity profile predicate), processing determines which (if any) contracts match the ad opportunity.

In some embodiments, the system 150 might host a variety of modules to serve management and control operations (e.g. objective optimization module 110, forecasting module 111, data gathering and statistics module 112, storage of advertisements module 113, automated bidding management module 114, admission control and pricing module 115, impression and contract tree construction module 116, and matching and projection module 117, etc) pertinent to contract matching and delivery methods. In particular, the modules, network links, algorithms and data structures embodied within the system 150 might be specialized on as to perform a particular function or group of functions reliably while observing capacity and performance requirements. For example, an additional content server 108 in conjunction with an auction engine 107 might be required to select a set of top N contracts that satisfy a complex target description and complete an auction to identify a winner. The top N contracts might be selected from a database (e.g. index) of many thousands or millions of contracts, and the complex target description might involve dozens, or hundreds, or even more attributes and values; further, the selection of contracts and completion of the auction might have to begin and end within a period of a fraction of a second.

In order for a contract for delivery of one or more impressions to be satisfied, there should exist specific inventory to be delivered under the terms of the contract. In the case of online Internet advertising, an item of inventory (e.g. an impression) might be specified in an arbitrarily complex description that might involve dozens, or hundreds, or even more attributes and values, which attributes and values are to be matched to one or more matching contracts.

As shown in FIG. 2A, a table of inventory 2A10 can be constructed showing a variety of demographics. For example, a history of hits and other analytics (i.e. actual hits as measured) might indicate how many hits occurred in a particular month (e.g. January 2007) at a particular page (e.g. empirestate.com had 10,000 visitors) or sub-page (e.g. empirestate.com/hotels had 9,000 visitors). And to the extent that any particular demographics can be captured (e.g. visitors from New York, visitors from California, male visitors, etc) those counts might also be captured and used in predicting inventory for an upcoming time period. As shown, FIG. 2A depicts page hits for just one month (e.g. January, 2007), however any number of time periods might be represented in a three-dimensional table.

Figure 2B:
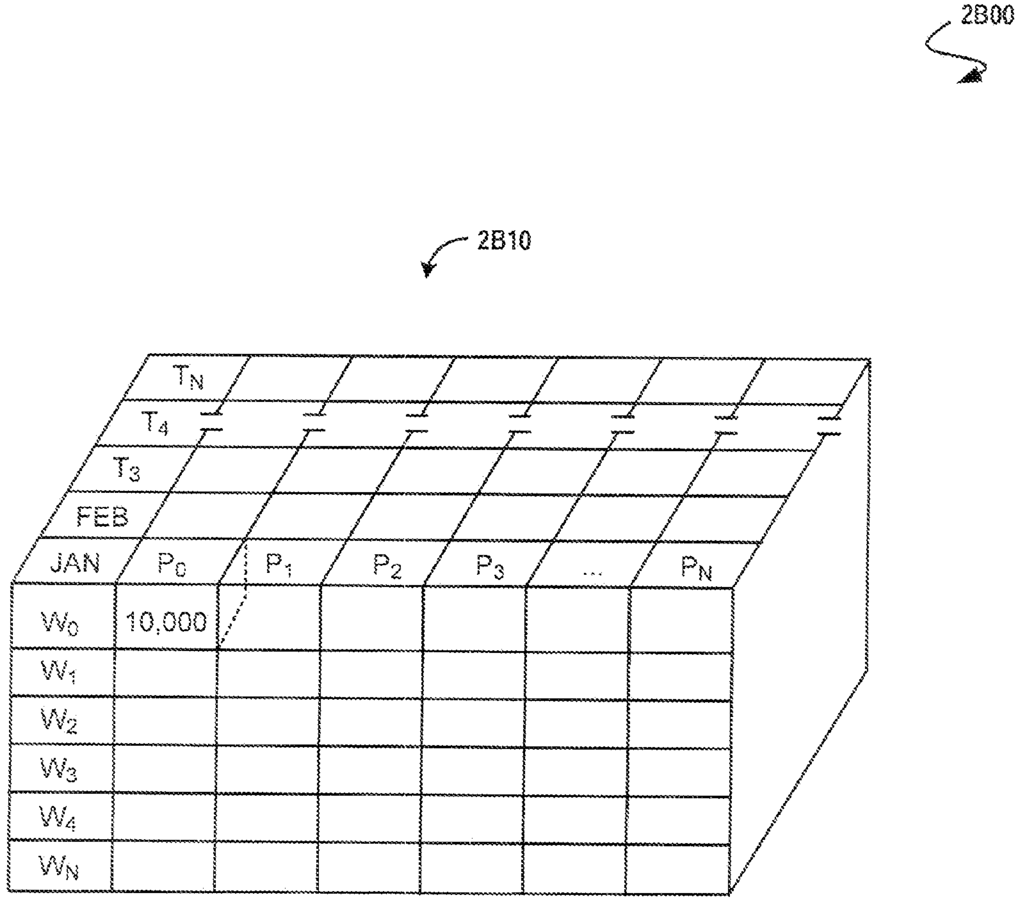
FIG. 2B is a depiction of a three-dimensional table of inventory, according to one embodiment.

FIG. 2B depicts a three-dimensional table 2B10 showing dimensions of webpage (e.g. $W_0$, $W_1$, $W_2$, $W_n$), time period (e.g. $T_0$, $T_1$, $T_2$, $T_n$), and some selection of demographic properties (e.g. $P_0$, $P_1$, $P_2$, $P_n$). As shown, there were 10,000 hits in January at webpage $W_0$ corresponding to the property $P_0$. In the context of demographics available for various populations, FIG. 2B is a trivial example in only three dimensions. Typically, many more dimensions are available, and might be represented in an N-space array (i.e. high-dimensional space). Of course any M-dimensional array where M is greater than three is difficult to show on paper. However alternative representations such as an M-dimensional array (where M is any positive integer) and methods for identifying sets of points (e.g. showing conjoint or disjoint sets) or lists of attribute value pairs (e.g. {state, California}, {gender, male}, {age, 45}, {weight, 165}) might be used to represent points in M-dimensional space. In alternative representations, the conjoint might be written as lists of desired matches (e.g. state=California, gender=male, age=45, weight=165).

Figure 2C:
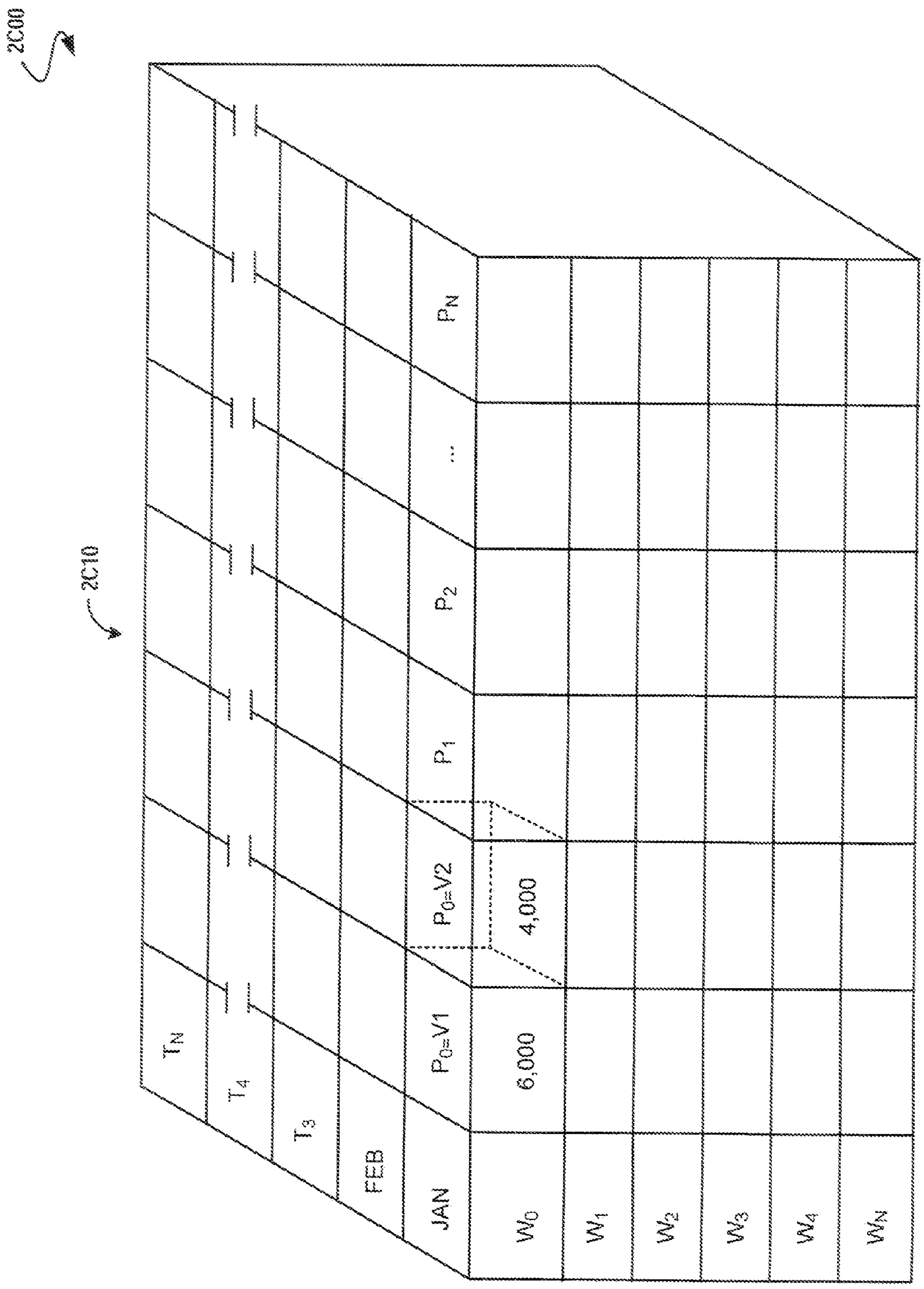
FIG. 2C is a depiction of a three-dimensional table of inventory corresponding to a multi-valued attribute, according to one embodiment.

FIG. 2C depicts a three-dimensional table 2C10 showing dimensions of webpage (e.g. $W_0$, $W_1$, $W_2$, $W_n$), time period (e.g. $T_0$, $T_1$, $T_2$, $T_n$), and a selection of demographic properties (e.g. $P_0$, $P_1$, $P_2$, $P_n$), Properties of a webpage might be expressed such that any demographic property (e.g. $P_0$, $P_1$, $P_2$, $P_n$) might cover multiple values of the corresponding property (e.g. $P_0$="Value1", $P_0$="Value2"), with a property value corresponding to a particular value taken on by the property $P_0$. A single logic expression (e.g. {(page=$W_0$) AND (month=JAN) AND ($P_0$=V1 OR $P_0$=V2)} can thus he used to describe multiple points in an M-dimensional space. As shown, there exists an inventory of 10,000 units that satisfy the preceding expression, 6,000 units where $P_0$=V1, plus another 4,000 units where $P_0$=V2. Further, building on the distinction between FIG. 2B and FIG. 2C, an advertiser might seek a range of properties that is codified by a simple value/attribute pair. However, such an attribute value pair expressed as {state, California} might be more specific than desired by an advertiser based on the border of California and Arizona. Accordingly, a broader range of properties might be codified by an expression of a multi-value attribute, such as {state IN {California, Arizona}}.

In some cases, a fine degree of specificity is useful in targeted advertising. For example, an advertiser for a hotel in mid-town New York City might want to place advertisements only on the empirestate.com/hotels webpage as shown to an Internet user, and then only if the Internet user is from California, and then only if the Internet user is male, and so on. Such an advertiser might be willing to pay a premium for a spot that is most prominently located on the webpage. In fact, such an advertiser might be joined by other hoteliers who also want their advertisements to be displayed in the most prominently located spot on the webpage.

A contract might be as simple as the contracts described in the previous example, or a contract might be more complex, possibly describing a target (at least n part) using an arbitrarily complex expression involving many terms (e.g. attributes, possibly many attribute values, and possibly any number of multi-valued attributes). A contract might also specify or require varying degrees of confidence that a particular contract term is satisfied (e.g. confidence that a target is male is 90%, confidence that a target is domiciled in California is 80%).

Figure 2D:
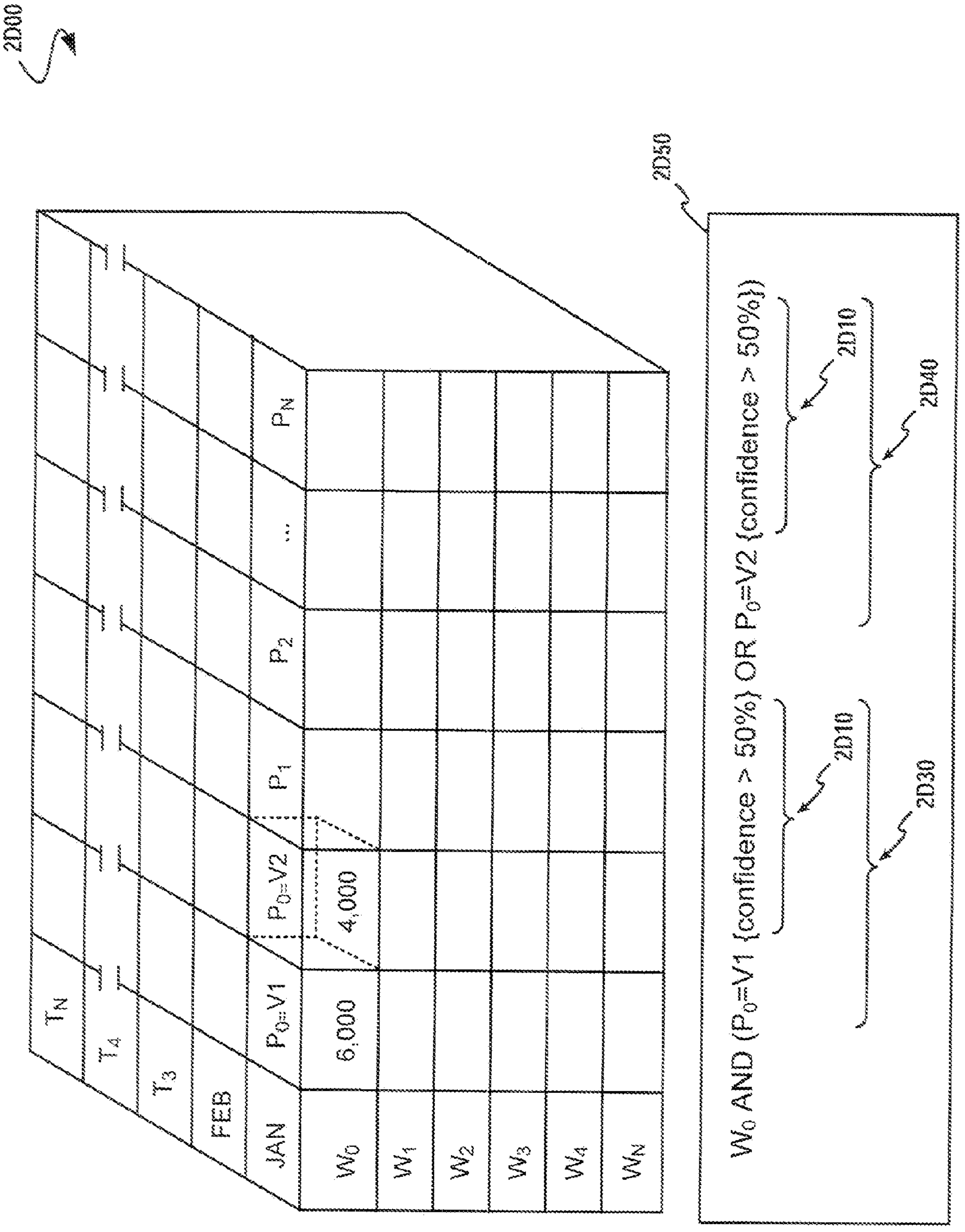
FIG. 2D is a depiction of a three-dimensional table of inventory corresponding to a multi-valued attribute with a confidence operator, according to one embodiment.

FIG. 2D is a depiction of a three-dimensional table of inventory corresponding to a multi-valued attribute with a confidence operator. As shown, there is inventory (6,000 units) for webpage $W_0$ in January where attribute $P_0$ has value V1. Also as shown, there is inventory (4,000 units) for webpage $W_0$ in January where attribute $P_0$ has value V1. In some cases inventory is a forecast, and thus the existence of the specified inventory might be forecasted only within some statistical degree of certainty (e.g. a confidence measure). For example, a forecast that a particular quantity $X_0$ of users will click on a particular webpage $W_0$ within the month of December might be forecasted on the basis that in 8 of the past 10 months at least quantity $X_0$ of users have clicked on that page, thus the month of December might be forecasted for quantity $X_0$ clicks with a confidence measure of 80%. In other cases, the value of an attribute might be forecasted only within some statistical degree of certainty (e.g. a confidence measure) due to uncertainties in the data gathering technique. For example, a data gathering and statistics module 112 might accurately report that there are one million drivers of imported automobiles. However, such a data gathering report might have been based on a small sample population, and the sample data might only indicate which drivers are male and which are female within a statistically accurate +/−20% margin of error. Thus the data might be reported as $driver_{imported}$="male" {confidence 30%} and/or $driver_{imported}$="female" {confidence 30%}. Given that the certainty of a data point in a multi-dimensional space may be qualified with a confidence measure, it follows that a contract might express permittivity for matching impressions. As shown, example contract 2D50 is expressed as two conjuncts where the conjunct including the expressions $P_0$=V1 2D30 and $P_0$=V2 2D40 each include a confidence operator 2D10. This contract expresses the following: In January, target webpage $W_0$ where it is better than even odds that attribute $P_0$ has value V1 or it is better than even odds that attribute $P_0$ has value V2.

Of course, a contract might be represented in a significantly more complex Boolean expression, possibly using arbitrarily complex operators involving multi-value operators and confidence operators. For example, the contract {gender IN {Male} AND topic IN {Life, News} AND income IN {50 k-100 k} AND clickHistory {Active} AND gee IN {Santa Clara {60%}}AND New York {99%}} includes both a multi-value operator (e.g. topic IN {Life, News}) as well as a multi-value operator that also includes confidence metrics (e.g. geo IN {Santa Clara {60%}, New York {99%}}).

What is needed are techniques that enable contracts expressed as complex predicates to be matched to impression opportunities expressed as complex predicates. Indeed increased targeting using complex predicates allows advertisers to reach more relevant customers. For example, an advertiser selling family fitness aids might specify a target using broad targeting constraints such as "1 million Yahoo! users from 1 Aug. 2008-31 Aug. 2008". In contrast, an advertiser selling fitness aids for surfers might specify a much more fine-grained constraint such as "10,000 Yahoo! users from 1 Aug. 2008-8 Aug. 2008 who are California males between the ages of 20-35 who are working in the healthcare industry and like surfing and autos".

Figure 3:
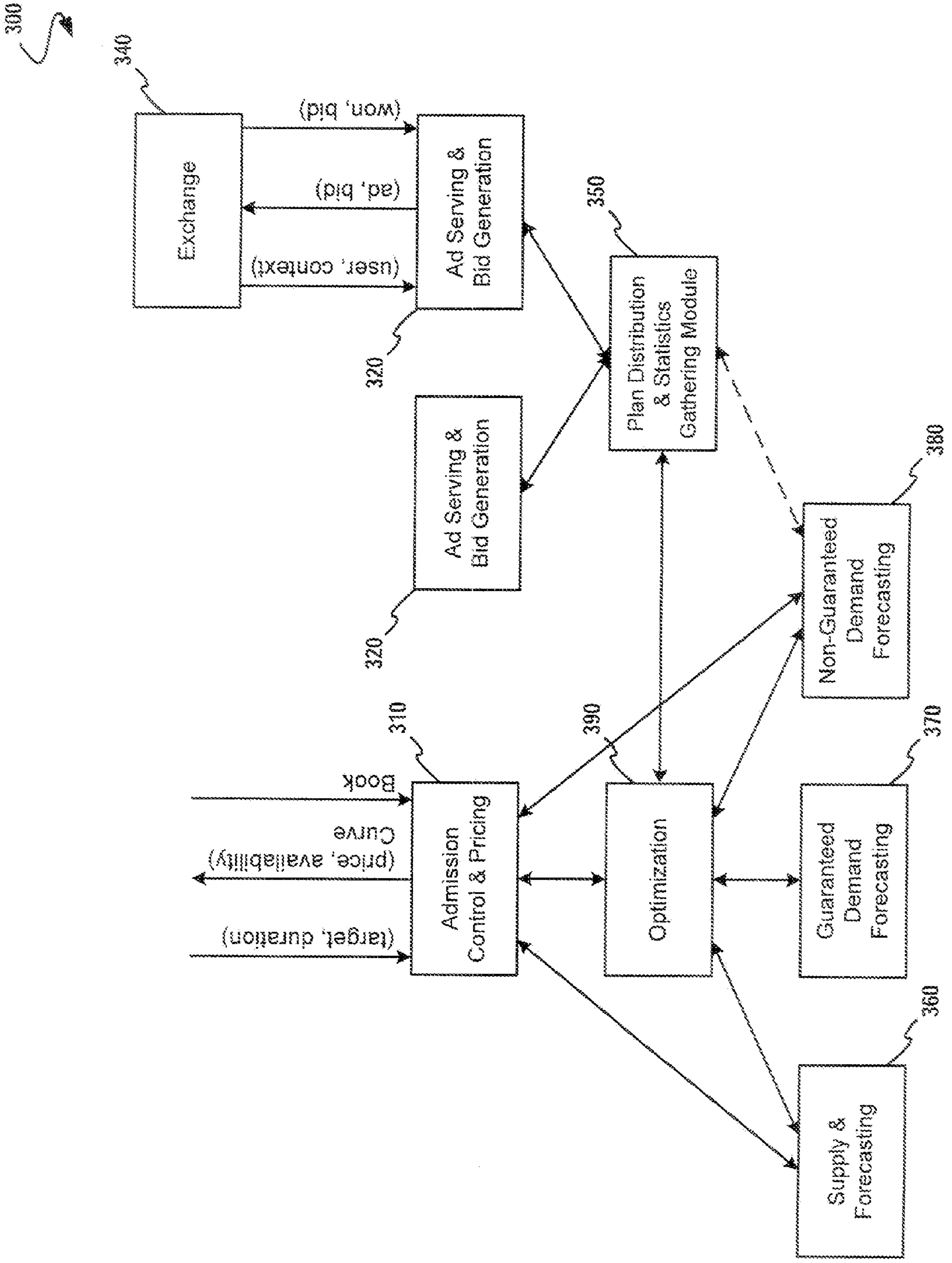
FIG. 3 is a depiction of a system for serving advertisements within which some embodiments may be practiced.

FIG. 3 depicts a system 300 in which embodiments of the invention might be practiced. As depicted, a system of components cooperatively communicate such that various overall objectives might be met. For example, an objective stated as "optimize guaranteed delivery revenue" might employ a module to coordinate the data exchange and execution of various system components, including (for example) an admission control module 310, an ad serving and bid generation module 320, an exchange module 340, a plan distribution and statistics gathering module 350, a supply and forecasting module 360, a guaranteed demand forecasting module 370, a non-guaranteed demand forecasting module 380, and an optimization module 390.

Given such an environment, the admission control portion of admission control module 310 serves to generate quotes for guaranteed contracts and accept bookings of guaranteed contracts, the pricing portion of admission control module 310 serves to price guaranteed contracts, the ad serving portion of ad server and bid generation module 320 selects guaranteed ads for an incoming opportunity, and the bidding portion of ad server and bid generation module 320 submits bids for he selected guaranteed ads on an exchange 340. Additionally, an optimizer 390 might communicate with a plan distribution and statistics gathering module 350, and one or more forecasting modules 360, 370, 380 and return results that optimize for an overall objective.

Given the system 300 of FIG. 3, a possible operational scenario might proceed as follows:

The admission control module supports queries and other interactions with sales personnel who quote guaranteed contracts to advertisers and book the resulting contracts. A sales person issues a query with a specified target (e.g. "100,000 Yahoo! users from 1 Aug. 2008-8 Aug. 2008 who are California males between the ages of 20-35 who are working in the healthcare industry and like surfing and autos"). The admission control module 310 returns the available inventory for the target and returns the associated price for the available inventory. The sales person can then book corresponding contracts accordingly. The ad server and bid generation module 320 takes in an opportunity (e.g. an impression opportunity), and returns an ad corresponding to the opportunity along with the amount that the system is willing to bid for that opportunity in the spot market (the Exchange).

In one embodiment, the operation of the entire system 300 is orchestrated by an optimization module 390. This optimization module 390 periodically takes in a forecast of supply (future impression opportunities), guaranteed demand (expected guaranteed contracts), and non-guaranteed demand (expected bids in the spot market) and matches supply to demand using an overall objective function. The optimization module then sends a plan of the optimization result to the admission control module 310. Of course, inasmuch as the plan is based on statistics relating to data gathered over time, the plan is updated every few hours based on new estimates for supply, new estimates of demand, and new estimates for deliverable impressions.

In another scenario, and one that relates to techniques for finding all applicable contracts (i.e. guaranteed as well as non-guaranteed contracts), bringing their respective bids to the unified marketplace might operate in a scenario described as follows:

When a sales person issues a query (e.g. to the admission control module 310) for some contract (e.g. including a target specification and duration) for future delivery (i.e. guaranteed or non-guaranteed), the system 300 invokes the supply and forecasting module 360 to identify how much inventory is available for that contract. Since targeting queries can be very fine-grained in a high-dimensional space, the supply forecasting module might employ a scalable multi-dimensional database indexing technique to capture and store the correlations between different targeting attributes. The scalable multi-dimensional database indexing technique might also serve to capture and retrieve correlations found among multiple contracts. For example, if there are two sales persons submitting contracts in contention (e.g. "Yahoo! finance users who are California males" and "Yahoo! users who are aged 20-35 and interested in sports"), some number of forecasted impression opportunities might match both contracts, but of course the inventory of matching impression opportunities should not be double-counted. In order to deal with contract contention for supply in a high-dimensional space, the supply forecasting system might produce impression samples (i.e. a selected subset of the total available inventory) as opposed to just available inventory counts. Thus, impression opportunity samples from available inventory might be used to determine how many contracts can be satisfied by each impression opportunity. Given the impression samples, the admission control module uses the plan to calculate the extent of contention between contracts in the high-dimensional space. Finally, the admission control module 310 might return allocated available inventory to each of the sales persons without any double-counting. In addition, the admission control module might calculate the price for each contract and return pricing along with the quantity of allocated impression opportunities.

Now, stating the problem to be solved more formally, given an advertising opportunity (e.g. an impression opportunity), specified as a predicate or Boolean expression (e.g. a vector, a list, a set of attributes each of which may have one or more associated values, etc) including assignments of one or more attributes to one or more values, find all of the contracts that could bid on this opportunity. For example, given the impression opportunity profile predicate {(state=CA) AND (gender=male) AND (age=50)}, some possibly matching contracts would include those asking for {(gender=male) AND (state=CA)}, and would include those asking for {(gender=male) AND {(age=50)} because each clause of each of those contracts are satisfied against the example impression opportunity profile predicate. The embodiments of the invention herein permits both disjunctive as well as conjunctive types of contracts, and even contracts including more complex predicates, to be handled efficiently. As regards contracts including complex predicates, embodiments of the invention disclosed herein support "IN" operators (e.g. state IN (NY, CA, MA)) and "NOT-IN" operators (e.g. state NOT-IN (NY, CA, MA)), as well as confidence operators (e.g. $driver_{imported}$="male" {confidence 30%}).

In various embodiments, a contract might be specified in some arbitrarily complex logic expression (e.g. involving any number of multiple-predicate expressions) which expression can be mathematically transformed (e.g. decomposed, normalized) into a disjunctive normal form (DNF) or into a conjunctive normal form (CNF). A contract specified as a DNF expression contains any number of "OR" terms, any one of which, if satisfied, satisfies the specification of the contract. A contract specified as a CNF expression contains any number of "AND" conjunctions, such that all conjunctions must be satisfied in order to satisfy the specification of the contract. Once a contract has been normalized (i.e. into DNF or into CNF), each term can be considered a subcontract. To handle contracts in DNF (OR-ing), the techniques disclosed herein might split a contract into subcontracts (one for each term), and produce an index entry for each of the subcontracts. To support contracts in CNF (AND-ing), the techniques disclosed herein might check to confirm that each of the subcontracts corresponding to its contract is found in the index.

Section II: Detailed Description of the Problem Solved by an Efficient Inverted Index System As indicated in the foregoing, one application served by the construction of an efficient inverted index system is related to booking and satisfying online advertisement contracts. It should be emphasized that the time period between an Internet user's click on a link and the display of the corresponding page—including any advertisements is a short period—desirably a fraction of a second. It is within this short time period that applicable contracts must be identified, some or all of those contracts compete for spots on the soon-to-be-displayed webpage, the winner's or winners' advertisements are selected and placed in the webpage, and finally the webpage is rendered at the user's terminal. Thus, an efficient inverted index might be efficient as measured by latency, as well as efficient with respect to computing cycles, especially when many contracts may be booked at any given moment in time.

Further, the inverted index system may receive any arbitrarily complex expressions that describe a contract. The indexing and matching techniques disclosed herein address at least solving the lookup and contract-matching problem efficiently and even under conditions where the input data (e.g. a contract predicate, an impression predicate) is complex.

Syntax and Construction of Contracts and Impression Opportunities

Following the foregoing discussion, a contract can be described in a Boolean expression using IN, NOT-IN, and {confidence} operators as basic operators. An impression opportunity is a set of one or more points within a multi-dimensional space where any single point can be described using finite domains for each attribute along a dimension.

Section III: Syntax Used in Construction of an Inverted Index

Contract Syntax Using Basic Predicates

As described herein, there are several types of basic predicate operators: Equality predicates, IN predicates, and NOT-IN predicates. For example, state=CA says that the state is CA, the predicate state IN {CA, NY} says that the state could either be CA or NY, and the predicate state NOT-IN {CA, NY} indicates the state could be anything other than CA or NY. It is important to observe that state IN {CA, NY} is equivalent to state IN {CA} ∨state IN {NY} (making it a disjunction of length 2) while state NOT-IN {CA, NY} is equivalent to state NOT-IN {CA} ∧state NOT-IN {NY} (making it a conjunction of length 2). Notice that IN and NOT-IN predicates also cover equality and non-equality predicates. Other basic predicate operators might also be supported. Ranges of integers can be supported by mapping them into equality. For example, using the demographic for a person in the age range 18-24, that age range might be mapped to a single value. Thus an age range can be described in an IN or NOT-IN predicate. For example, the age range 18-24 might be mapped to value r3, the age range 25-32 might be mapped to value r4, etc. Other demographics that are expressed as ranges might also be mapped into symbolic, string, or integer values, etc. Thus the characteristic of annual income in the range $22 k to $56 k per year might be mapped to income=3.

In some basic forms, a contract is a DNF or CNF expression on the two basic expressions IN and NOT-IN. For example, (state IN {CA, NY} ∧age IN {20}) ∨(state NOT-IN {CA, NY} ∧interest IN {sports}) is a DNF expression using the two types of atomic expressions while (state IN {CA, NY} ∨age IN {20}) ∧(interest IN {sports}) is a CNF expression. Notice that a conjunction can either be a DNF expression with one disjunct or a CNF expression with conjuncts of size 1.

Impression Opportunity Profile Predicate Types

A simple impression opportunity profile of an impression opportunity includes a set of attributes and corresponding single value pairs. For example, {state=CA ∧age=20 ∧interest=sports} is a simple impression opportunity profile. A simple impression opportunity profile describes only a single point in a multi-dimensional space. That is, within a predicate describing a simple impression opportunity profile, each attribute used to describe an impression opportunity profile is expressed with a corresponding single value.

A multi-valued impression opportunity profile predicate of an impression opportunity includes at least one expression of an attribute with a corresponding multi-value set. For example, {state=IN{CA, AZ} ∧age=20 ∧interest=sports} is a multi-valued impression opportunity profile since the conjunction state=IN{CA, AZ} expresses the attribute state with its corresponding multi-value set IN {CA, AZ}. A multi-valued profile of an impression opportunity describes multiple points in a multi-dimensional space. Any number of expressions of an attribute with a corresponding multi-value set and/or any number of expressions with a corresponding single value may be combined to form a multi-valued impression opportunity profile predicate.

Section IV: Index Construction for Matching Satisfying Contracts to Impression Opportunities Using Complex Predicates In one embodiment, construction of an inverted index may commence by making posting lists of contracts for each IN predicate. For each attribute name and single value pair of an IN predicate, we make one posting list. Hence, the index structure "flattens" the IN predicates when constructing the posting lists. In many of the embodiments described herein, the inverted index is sorted. Furthermore, each posting list might sort its contracts by contract id, and the posting lists themselves might be sorted by the ids of their current contracts. Of course other ids or keys might be used for sorting the posting lists and/or for sorting contracts within a posting list, and such alternative ids and keys are possible and envisioned. For example, contracts might be sorted by any arbitrary key, such as customer type.

Algorithm 1: Construct inverted index

```
1:  input: set of contracts C
2:  output: inverted index idx
3:  idx.init( )
```

-continued

Algorithm 1: Construct inverted index

```
4:  for all contract c ∈ C do
5:      for all atomic predicate p ∈ c do
6:          c'← c /*make copy of contract*/
7:          if p.type = NOT-IN then
8:              c'.flag ← NOT-IN
9:          end if
10:         for all value ∧ ∈ p.list do
11:             idx.get.List(p.attrname, v).add(c') /*make sure to
keep the posting lists and the contracts within each posting list sorted*/
12:         end for
13:     end for
14: end for
15: return idx
```

EXAMPLE

Consider the two contracts in Table 1. For each attribute name and possible value, Algorithm 1 constructs a posting list of contracts with flags. The final inverted index is shown in Table 2. Notice how all the IN predicates are flattened out into single values. Each posting list has its contracts sorted, and the posting lists themselves are also sorted according to the contracts they have.

TABLE 1

A set of contracts

| Contract | Expression |
|---|---|
| $c_1$ | age IN {1, 2} ∧ state IN {CA} |
| $c_2$ | age IN {1, 2} ∧ state IN {NY} |
| $c_3$ | age IN {1, 3} |
| $c_4$ | state IN {CA} |

TABLE 2

Inverted index for Table 1

| Key | Posting List |
|---|---|
| (age, 2) | $c_1 \rightarrow c_2$ |
| (age, 1) | $c_1 \rightarrow c_2 \rightarrow c_3$ |
| (state, CA) | $c_1 \rightarrow c_4$ |
| (state, NY) | $c_2$ |
| (age, 3) | $c_3$ |

The Counting Algorithm

In an embodiment known as The Counting Algorithm, the algorithm is applied on contract expressions in the form of conjunctions. The idea is to maintain a counter for each contract on how many predicates of the contract are satisfied. The inverted index for the conditions of the impression opportunity is scanned once. This algorithm can be considered as a baseline algorithm for performance comparison. Notice that the Counting Algorithm can support NOT-IN predicates by modifying Step 8 of Algorithm 2, namely by setting the Count value to minus infinity if the contract is tagged NOT-IN.

Algorithm 2: The Counting Algorithm

```
1:  input: inverted index idx, set of contracts C, impression I
2:  output: set of contracts O matching I
3:  O ← Ø
4:  Count.init( )
```

-continued

Algorithm 2: The Counting Algorithm

```
5:  P ← idx.GetPostingLists(I) /*Get the posting lists of each (name,
single value) pair of I*/
6:  for i=0..(P.size( ) − 1) do /*for all posting lists*/
7:      for j=0..(P[i].size( ) − 1) do /*for all contracts within posting
list*/
8:          Count[P[i][j]]← Count[P[i][j]]+1
9:      end for
10: end for
11: for all c ∈ C do
12:     if Count[c]= |c| then
13          O ← O ∪{c}
14:     end if
15: end for
16: return O
```

EXAMPLE

Consider the impression opportunity I={age=1∧state=CA}. Given the inverted index in Table 2, the posting lists for I are shown in Table 3. Scanning through the posting lists and incrementing the counters for each contract results in the final counts as shown in Table 4.

TABLE 3

Posting lists for impression opportunity I

| Key | Posting List |
|---|---|
| (age, 1) | $c_1 \rightarrow c_2 \rightarrow c_3$ |
| (state, CA) | $c_1 \rightarrow c_4$ |

TABLE 4

Final counts for the contracts

| Contract | Count |
|---|---|
| $c_1$ | 2 |
| $c_2$ | 1 |
| $c_3$ | 1 |
| $c_4$ | 1 |

For each contract in Table 4, compare the count value with the number of predicates in the contract (i.e. the size of the contract). As a result, contracts $c_1$, $c_3$, and $c_4$ are satisfied by I because their counts are equal to their sizes.

Complexity:

The complexity of the Counting algorithm is linear to the sum of the posting list sizes of P:

$$O(\Sigma_{k=0 \ldots |P|-1} |P[k]|)$$

The WAND Algorithm

Another embodiment uses a variant of the WAND algorithm [Broder et al.] The WAND algorithm assumes a conjunction of IN predicates for contracts. Compared to the Counting algorithm, WAND makes the following improvements.

1. WAND exploits the conjunctive form structure of the contracts to skip contracts (in the posting lists) that are guaranteed not to match the impression opportunity.
2. WAND partitions contracts according to their sizes (i.e. number of predicates) and processes one partition at a time. In various embodiments, this partitioning is expeditious when using constant thresholds for finding matching contracts, and the size of each contract is the threshold used for matching.

In this algorithm, contracts of size K=0 (i.e. there are no predicates), are deemed to always match. Since contracts of size K=0 do not appear in the posting lists, a separate posting list (called Z) that contains all contracts of size 0 is maintained. When K=0, Z is always returned by the idx.GetPostingLists method.

In the examples following, the posting lists are denoted for contracts of size K as $P_K$. For example, the posting lists for contracts of size 2 is denoted as $P_2$.

Algorithm 3: The WAND Algorithm

```
1:   input: inverted index idx, set of contracts C, impression I
2:   output: set of contracts O matching I
3:   O ←Ø
4:   MaxSize ←idx.GetMaxContractSize(I)
5:   for K =0..MaxSize do
6:        P ← idx.GetPostingLists(I,K) /*Get posting lists for all the
contracts that have size K. If K =0, also retrieve Z.*/
7:        if K =0 then /*Other than the additional posting list, the
processing of K =0 and K =1 is identical*/
8:             K ← 1
9:        end if
10:       if P.size( )<K then
11:            continue to next for loop
12:       end if
13:       while P[K − 1].Current ≠ null do
14:            SortByContractID(P) /*the cost is logarithmic: one
bubbling down per posting list advanced*/
15:            if P[0].Current.ID = P[K − 1].Current.ID then
16:                 O ← O ∪{P[0].Current}
17:                 NextID ← P[K − 1].Current.ID +1 /*NextID is the
smallest possible ID after current*/
18:            else
19:                 NextID ← P[K − 1].Current.ID
20:            end if
21:            for L =0..K − 1 do
22:                 P [L].SkipTo(NextID) /*skip to smallest ID in P[L]
such that ID ≧ Next ID*/
23:            end for
24:       end while
25:  end for
26:  return O
```

EXAMPLE

Algorithm 3 extracts the posting lists of I from idx. This time, however, the algorithm extracts posting lists for each possible size of contract. In Table 1, there are shown two sizes of contracts: size K=1 contains the set of contracts ($c_3$, $c_4$) and size K=2 contains the set of contracts ($c_1$, $c_2$). Hence, Table 5 shows two sets of posting lists for each size. The current contract of each posting list is underlined. Notice that in this example, the posting lists are in sorted order according to their contract IDs.

TABLE 5

WAND posting lists for impression opportunity I

| Size of Contracts | Key | Posting List |
|---|---|---|
| 1 | (age, 1) | $c_3$ |
| | (state, CA) | $c_4$ |
| 2 | (state, CA) | $c_1$ |
| | (age, 1) | $\underline{c_1} \rightarrow c_2$ |

Processing continues by processing P1, that is, the posting lists of contracts with size 1. Since $P_1$[0].Current.ID= $P_1$[0].Current.ID=3 at Step 15, this example adds $c_3$ to O in Step 16. The algorithm then skips all the posting lists to $c_4$ because P[0].Current.ID+1=3+1=4. Hence, $P_1$[0] reaches the end of the list while $P_1$[1] still has $c_4$ as its current contract. The posting lists after sorting $P_1$ are shown in Table 6. Notice that the posting list of (age, 1) is placed at the end because it is done with processing. Since $P_1$[0].Current.ID=$P_1$[0].Current.ID=4 at Step 15, $c_4$ is also accepted and included in O. After advancing the posting list $P_1$[0], the algorithm exits the while loop in Step 13.

TABLE 6

Sorted result of $P_2$ during first loop

| Key | Posting List |
|---|---|
| (state, CA) | $c_4$ |
| (age, 1) | $c_3 \rightarrow \underline{\text{null}}$ |

Next, process P2 in the second for loop. Since K is 2 and $P_2$[0].Current.ID=$P_2$[1].Current.ID=1, Step 16 adds $c_1$ to O. Since NextID is 2, we advance both posting lists in $P_2$ to $C_2$. Notice that the posting list with key (state, CA) does not contain $c_2$ and thus points to null, i.e. the end of the list. The posting lists after sorting $P_2$ in Step 14 are shown in Table 7. This time, $P_2$[0].Current=$c_2$ while $P_2$[1].Current=null, so go back to Step 13. Since $P_2$[1].Current=null, terminate the while loop and return O={$c_1$, $c_3$, $c_4$} as the result.

TABLE 7

Sorted result of $P_2$ during second loop

| Key | Posting List |
|---|---|
| (age, 1) | $c_1 \rightarrow \underline{c_2}$ |
| (state, CA) | $c_1 \rightarrow \underline{\text{null}}$ |

Complexity:

Although WAND improves the Counting algorithm by using skipping and partitioning techniques, its complexity is actually greater than that of the Counting Algorithm. In the worst case, the WAND Algorithm needs to sort the posting list P while advancing one posting list in Step 22. Sorting in Step 14 actually takes logarithmic time to |P| because the inverted index is initially sorted, and it is only needed to bubble down one posting list in P using a heap to maintain a sorted order for each posting list advanced. Hence, the complexity becomes $$O(\log(|P|) \times \Sigma_{k=\ldots |P|-1} |P[k]|)$$

The WAND Algorithm and variants are disclosed in commonly-owned US patent application entitled "System and Method for Automatic Matching of Highest Scoring Contracts to Impression Opportunities Using Complex Predicates and an Inverted Index" filed Jul. 14, 2009 under Ser. No. 12/502,742, which application is hereby incorporated by reference for all purposes. In particular, variants of the WAND Algorithm provide efficient support for indexing including NOT-IN predicates in arbitrarily complex DNF or CNF expressions.

Section V: Index Construction for Matching Highest Scoring Contracts to Impression Opportunities Using Complex Predicates As indicated above, the WAND Algorithm has been extended to include building an inverted index of contracts when the set of contracts contains targets reduced to CNF expressions, even when containing NOT-IN predicates. Still further improvements are possible and envisioned. In particular, the disclosure of this section provides several approaches to handling an inverted index that includes weighting. Suppose each contract, in addition to being specified with any arbitrarily complex Boolean expression (BE) also has an association with one or more weighting coefficients, which coefficients can be used in a quantitative calculation of a goodness score. The ability to calculate a goodness score implies that not all contracts that satisfy some particular Boolean expression need be regarded as equal. The inverted index embodiments of Section IV serve for efficiently retrieving all matching contracts. The algorithms and data structures are applied and extended for efficiently retrieving the top N contracts.

One approach for retrieving the top N contracts would be to first find all of the matching contracts, calculate the goodness score for each, then sort by the goodness score and return only the top N. As aforementioned, the total number of matching contracts may be a large number (e.g. in the hundreds or thousands or more), thus, the application of such an approach involves significant computational power for scoring the total number of matching contracts, even though the number of top N contracts might be a quite small number (e.g. 5, 10, 20, etc). Techniques for matching highest scoring contracts to impression opportunities are disclosed in commonly-owned US patent application entitled "System and Method for Automatic Matching of Highest Scoring Contracts to Impression Opportunities Using Complex Predicates and an Inverted Index" filed Jul. 14, 2009 under Ser. No. 12/502,742, which application is hereby incorporated by reference for all purposes.

Scoring

The weighted score of a BE E reflects the "relevance" or goodness of E to an assignment (i.e. an assignment being an impression opportunity) S. For example, a user interested in sports might be more interested in an advertisement for sport shoes than an advertisement for flowers. If E is a conjunction of $\in$ and $\notin$ predicates, the score of E is defined as $$\mathrm{Score}_{conj}(E,S)=\Sigma_{(A,v)\in IN(E)\cap S} w_E(A,v)\times w_S(A,v)$$

where IN(E) is the set of all attribute name and value pairs in the $\in$ predicates of E (scoring $\notin$ predicates is ignored and $w_E(A,v)$ is the weight of the pair (A,v) in E). Similarly, $w_S(A,v)$ is the weight for (A,v) in S. For example, a BE age$\in${1,2} $\wedge$state$\in${CA} could be targeting young people in California, giving the pair (age,1) a high weight of 10 while giving (age,2) a lower weight of 5 and (state, CA) a weight of 3. If there is an assignment {age=1,state=CA}, where the first pair has a weight of 1 while the second pair has a weight of 2, the score of the BE to the assignment is 10×1+3×2=16.

In order to do top-N pruning, an upper bound UB(A,v) is generated for each attribute name and value pair (A,v) such that $$UB(A,v)\geqq \max(w_{E_1}(A,v),w_{E_2}(A,v), \dots)$$

For instance, if UB(age,1)=10, then (age,1) may not contribute more than a weight of 10 regardless of the BE.

DNF Scoring

The score of a DNF BE E is defined as the maximum of the scores of the conjunctions within E where E.i denotes the ith conjunction of E and |E| the number of conjunctions in E $$\mathrm{Score}_{DNF}(E,S)=\max_{i=1 \dots |E|}\mathrm{Score}_{conj}(E.i,S)$$

Intuitively, the DNF score is equal to the contribution of just one conjunction, that being the conjunction scoring the highest from among the group of conjunctions comprising the DNF expression.

CNF Scoring

The score of a CNF BE E is similar to $\mathrm{Score}_{conj}$ and is defined as the sum of the disjunction scores (using $\mathrm{Score}_{DNF}$) within E where E.i denotes the ith disjunction of E and |E| the number of disjunctions in E.

$$\mathrm{Score}_{CNF}(E,S)=\Sigma_{i=1 \dots |E|}\mathrm{Score}_{DNF}(E.i,S)$$

Intuitively, the CNF score combines all the contributions of each disjunction.

Inverted List Construction for DNF Representations

The discussion below describes how to build an inverted index data structure on the conjunctions of the BEs. First, create predicate size partitions by partitioning all the conjunctions by their sizes (i.e. number of predicates). The partition with conjunctions of size K are referred to as the K-index. Then, for each K-index, create posting lists for all possible attribute name and value pairs (also called keys) among the conjunctions. A posting list head contains the key (A,v). In an exemplary embodiment, each entry of a posting list represents a conjunction c and contains the ID of c as well as a bit indicating whether the key (A,v) is involved in an $\in$ or $\notin$ predicate in c A posting list entry $e_1$ is "smaller" than another entry $e_2$ if the conjunction ID of $e_1$ is smaller than that of $e_2$. In the case where both conjunction IDs are the same (in which case $e_1$ and $e_2$ appear in different lists), $e_1$ is smaller than $e_2$ only if $e_1$ contains a $\notin$ while $e_2$ contains an $\in$. Otherwise, the two entries are considered the same. Using this ordering, the entries in a posting list are sorted in increasing entry order, while in each K-index, the posting lists themselves are sorted in increasing entry order of their first entry. Notice there are no two entries with the same conjunction ID within the same posting list because an attribute is only allowed to occur once in each conjunction. Keeping the posting lists sorted in each K-index reduces the sorting time of posting lists as is performed in some of the algorithms presented herein (e.g. as in the Conjunction Algorithm, shown below).

As a special case, conjunctions of size 0 (e.g. age $\notin${3} is a conjunction of size 0 because it has no $\in$ predicates) are all included in a single posting list called Z. This special posting list is needed to ensure that zero-sized conjunctions appear in at least one posting list given an assignment. In addition, each entry in Z contains an $\in$ predicate. This modification ensures that Algorithm 11 also works for zero-sized conjunctions.

EXAMPLE

Consider the conjunctions in Table 8. The conjunctions are first partitioned according to their sizes ($c_1$,$c_2$,$c_3$,$c_4$ each have a size of 2, $c_5$ has a size of 1, and $c_6$ has a size of 0). For each size partition K=0, 1, 2 . . . , Table 9 shows the construction of the K-indexes. For instance, the key (age,4) has a posting list inside the partition K=1 and contains an entry representing $c_5$. Notice that the weight for any entry that has a NOT-IN indication (i.e. $\notin$) is partitioned into the K=0 partition because NOT-IN predicates are not considered for scoring.

TABLE 8

A set of conjunctions

| Contract | Expression |
|---|---|
| $c_1$ | age $\in$ {3} $\wedge$ state $\in$ {NY} |
| $c_2$ | age $\in$ {3} $\wedge$ gender $\in$ {F} |
| $c_3$ | age $\in$ {3} $\wedge$ gender $\in$ {M} $\wedge$ state $\notin$ {CA} |
| $c_4$ | state $\in$ {CA} $\wedge$ gender $\in$ {M} |
| $c_5$ | age $\in$ {3, 4} |
| $c_6$ | state $\notin$ {CA, NY} |

TABLE 9

| Inverted list corresponding to Table 8 | | |
|---|---|---|
| K | Key & UB | Posting List |
| 0 | (state, CA), 2.0 | (6, ∉, 0) |
| | (state, NY), 5.0 | (6, ∉, 0) |
| | Z, 0 | (6, ∈, 0) |
| 1 | (age, 3), 1.0 | (5, ∈, 0.1) |
| | (age, 4), 3.0 | (5, ∈, 0.5) |
| 2 | (state, NY), 5.0 | (1, ∈, 4.0) |
| | (age, 3), 1.0 | (1, ∈, 0.1) (2, ∈, 0.1) (3, ∈, 0.2) |
| | (gender, F), 2.0 | (2, ∈, 0.3) |
| | (state, CA), 2.0 | (3, ∉, 0) (4, ∈, 1.5) |
| | (gender, M), 1.0 | (3, ∈, 0.5) (4, ∈, 0.9) |

Section VI: Storing the Ranking of Boolean Expressions within an Inverted Index

DNF Ranking Algorithm

Ranking DNF BEs can be performed by maintaining a top-N queue of conjunctions and restricting them to have unique DNF IDs within the queue. Since the score of a DNF BE is the maximum score of its conjunction scores, the inverted index needs only to keep the single highest conjunction score for each DNF ID.

Referring to the weights in the inverted list representation of Table 9 to rank BEs, the number next to each posting list key (A,v) denotes the upper bound weight UB(A,v). In each posting list entry, the third value denotes the weight $w_c$ (A,v) for conjunction c. For example, the key (age,4) in Table 9 has a posting list inside the partition K=1 and contains an entry representing $c_5$ where $w_{c_5}$(age,4)=0.5 and UB(age,4)=3.0. The upper bound for key Z, UB(Z), is defined as 0. In addition, each entry in Z has a weight coefficient of 0.

Algorithms can be extended to efficiently deal with weights by adding pruning techniques.

EXAMPLE

Given the assignment S:{age 3, state=NY, gender=F}, the matching posting lists for K=2 from the inverted lists of Table 9 are shown in Table 10. Notice the assignment weight coefficients in the first column. As shown, the weights are $w_S$(state, NY)=1.0, $w_S$(age,3)=0.8, and $w_S$(gender, F)=0.9. Consider the example of N=1 (i.e. only the conjunction with the single highest score is maintained). The score of $c_1$ is $w_1$(state, NY)×$w_S$(state, NY)+$w_1$(age,3)×$w_S$(age,3)=4.0×1.0+0.1×0.8=4.08. The Nth highest score is thus set to 4.08.

TABLE 10

| Posting lists for S where K = 2 | | |
|---|---|---|
| $w_s$ | Key & UB | Posting List |
| 1.0 | (state, NY), 5.0 | (1, ∈, 4.0) |
| 0.8 | (age, 3), 1.0 | (1, ∈, 0.1) (2, ∈, 0.1) (3, ∈, 0.2) |
| 0.9 | (gender, F), 2.0 | (2, ∈, 0.3) |

A first pruning technique is illustrated in Table 11 where the posting lists are sorted after accepting $c_1$. Before checking whether the first and second posting lists have the same conjunction in their current entries, the algorithm computes the upper bound score of $c_2$ by computing UB(age,3)×$w_S$(age,3)+UB(gender,F)×$w_S$(gender,F)=1.0×0.8+2.0×0.9=2.6. Since 2.6 is smaller than the Nth score 4.08, the algorithm skips (i.e. prunes) the first two posting lists. In this way, pruning is accomplished by comparing a first upper bound score (e.g. the upper bound score of contract $c_2$) to a second upper bound score (e.g. the upper bound score of the Nth of top N contracts).

TABLE 11

| Sorted posting lists after accepting $c_1$ | | |
|---|---|---|
| $w_s$ | Key & UB | Posting List |
| 0.8 | (age, 3), 1.0 | (1, ∈, 0.1) (2, ∈, 0.1) (3, ∈, 0.2) |
| 0.9 | (gender, F), 2.0 | (2, ∈, 0.3) |
| 1.0 | (state, NY), 5.0 | (1, ∈, 4.0) EOL |

A second pruning technique is illustrated in Table 12, which shows the posting lists for K=1. Before processing the posting lists, first derive the upper bound score for all the conjunctions in the K-index by computing UB(age,3)×$w_S$(age,3)=1.0×0.7=0.7. Since an upper bound score of 0.7 is less than the current Nth score 4.08, skip processing (i.e. prune) the posting lists for K=1. Similarly, K=0 (not shown) can also be skipped to return the final solution which has the highest score 4.08.

TABLE 12

| Posting lists for S where K = 1 | | |
|---|---|---|
| $w_s$ | Key & UB | Posting List |
| 0.7 | (age, 3), 1.0 | (5, ∈, 0.1) |

CNF Ranking Algorithm

Ranking CNF BEs can be performed by maintaining a top-N queue of CNF BEs. In fact, the first pruning technique of the DNF ranking algorithm can be applied. Since the score of a CNF BE is the sum of the disjunction scores while the score of a disjunction is the maximum score of its predicates, the sum UB(A,v)×$w_S$(A,v) for the corresponding posting lists is still an upper bound for the.

However, the technique of computing the upper bound score as discussed in the DNF ranking algorithm does not apply directly to the CNF ranking algorithm because more than K disjunctions may contribute to the score of a CNF with size K (i.e. disjunctions that contain both ∈ and ∉ predicates do not count in the size of the CNF, but such predicates may have scores that add to the CNF score). Hence, the sum of the top-K UB(A,v)×$w_S$(A,v) values is not an upper bound score of a CNF BE. Rather, he upper bound score of a CNF BE is calculated as the sum of the disjunction scores.

EXAMPLE

Given the assignment S:{A=1,C=2}, the matching posting lists for K=2 from the inverted list of Table 34 are shown in Table 38 along with the given assignment weight coefficients $w_S$(A,1)=0.1 and $w_S$ (C,2)=0.9. As earlier discussed, the only matching CNFs in Table 38 are $c_3$ and $c_4$. In this example, after accepting $c_3$ and deriving the score $w_3$(A,1)×$w_S$(A,1)+$w_3$(C,2)×$w_S$(C,2)=0.3×0.1+2.7×0.9=2.46, this pruning technique skips processing CNF ID 4 from Step 16 because the upper bound of $c_4$ is UB(A,1)×$w_S$(A,1)+UB(A,1)×$w_S$(A,1)=0.5×0.1+0.5×0.1=0.1, which is smaller than 2.46.

TABLE 13

| Posting lists for S where K = 2 | | |
|---|---|---|
| $w_s$ | Key & UB | Posting List |
| 0.1 | (A, 1), 0.5 | (1, ∊, 0, 0.1) (2, ∊, 0, 0.3) (3, ∊, 0, 0.3) (4, ∊, 0, 0.1) |
| 0.9 | (C, 2), 3.0 | (2, ∊, 0, 2.5) (3, ∊, 1, 2.7) |
| 0.1 | (A, 1), 0.5 | (4, ∊, 1, 0.1) |

Section VII: Automatic Matching of Contracts in an Inverted Index to Impression Opportunities Using Complex Predicates with Multi-Valued Attributes In embodiments of the system 150, components of the additional content server, including modules for automated bidding management 114 and admission control and pricing module 115 perform processing such that, given an ad opportunity (e.g. an impression opportunity profile predicate), processing determines which (if any) contracts match the ad opportunity.

Herein are disclosed techniques for efficiently matching a given impression opportunity to one or more contracts. Techniques disclosed hereinabove include retrieving contracts matching a given impression opportunity from an inverted index when given conjunctions (see the Counting Algorithm and the WAND Algorithm). The intuition behind these algorithms is to efficiently eliminate contract evaluation for matching attribute-value pairs based on the count of the number of matching attribute-value pairs for a given conjunction. For instance, the impression opportunity predicate (state IN {CA,AZ} AND age IN {r3, r4}) has conjunct size of 2. This means that during impression opportunity query evaluation, only contracts that contain two or fewer conjunctions need be evaluated. The Counting Algorithm and the WAND Algorithm (and variants) are well suited to efficient retrieval of contracts where each and every impression opportunity query conjunction specifies only one value, such state=CA AND age=r5.

However, if even one of the impression opportunity query conjunction specifies an attribute that is multi-valued, e.g. state IN {CA,AZ}, simply counting the number of matches can generate invalid results. For instance, contract $c_Z$(state IN {CA,AZ} AND age IN {r3, r4}) has conjunct size 2 and it would have two matches for query state IN {CA,AZ} AND age=r5, however contract $c_Z$ should not be returned since the age=5 attribute-value test fails. One technique for addressing this problem is to expand the multi-valued attributes into ORs. For instance, if both attributes state and age are multi-valued, as in (state IN {CA,AZ} AND age IN {r3, r4}), then the predicate would be expanded as {(state=CA AND age=r3) OR (state=CA AND age=r4) OR (state=AZ AND age=r3) OR (state=AZ AND age=r4)}. Of course, this means that if a contract has v multi-value attributes, each with v_k possible values, it would be indexed using the number of ORs in the product v_1 times v_2 times . . . times v_k. This product becomes large quickly as the number of ORs in the product increases, and thus might generate a very large index for a given multi-valued contract.

Another approach uses the inverted index construction techniques described in the Counting Algorithm and the WAND Algorithm (thus avoiding creating very large indexes for multi-valued contracts), yet efficiently retrieves contracts matching an impression opportunity profile predicate involves.

Using the inverted index construction techniques discussed above, at the time a contract is indexed, it is indexed without expansion (e.g. according to the inverted index construction techniques detailed in the WAND Algorithm).

EXAMPLE

Consider the Example Contracts listed below, for which contracts their corresponding identifiers, conjunctions, and conjunction sizes are shown in Table 30.

TABLE 14

| A set of contracts | | |
|---|---|---|
| Contract | Conjunctions | Size |
| $ec_1$ | state ∊ {CA, AZ} ∧ age ∊ {r3, r4} | 2 |
| $ec_2$ | state ∊ {CA, AZ, NY} ∧ age ∊ {r5} | 2 |
| $ec_3$ | state ∊ {CA, AZ, NY, AK} | 1 |
| $ec_4$ | state ∊ {CA, AZ} ∧ age ∊ {r3, r4} ∧ income ∊ {6} | 3 |
| $ec_5$ | state ∊ {CA, AZ} ∧ age ∊ {r3, r4} ∧ income ∊ {6} ∧ gender ∊ {F} | 4 |

The conjunctions are first partitioned according to their sizes ($ec_1$,$ec_2$ each have a size of 2, $ec_3$ has a size of 1, $ec_4$ has a size of 3, and $ec_5$ has a size of 4). For each size partition size=1, 2, 3, 4 . . . , Table 14 shows the construction of the inverted index. The Key & UB column of Table 15 includes the shorthand representation of a key and an upper bound (UB) of weighting, and the Posting List expressions are written using the earlier-presented representation syntax.

TABLE 15

| Inverted list corresponding to Table 14 | | |
|---|---|---|
| Size | Key & UB | Posting List |
| 1 | (state, CA), 5.0 | (3, ∊, 0.1) |
| | (state, AZ), 5.0 | (3, ∊, 0.5) |
| | (state, NY), 5.0 | (3, ∊, 0.1) |
| | (state, AK), 5.0 | (3, ∊, 0.5) |
| 2 | (state, CA), 5.0 | (1, ∊, 0.1) (2, ∊, 0.1) |
| | (state, AZ), 5.0 | (1, ∊, 0.1) (2, ∊, 0.1) |
| | (state, NY), 5.0 | (2, ∊, 0.1) |
| | (age, r3), 1.0 | (1, ∊, 0.1) |
| | (age, r4), 3.0 | (1, ∊, 0.1) |
| | (age, r5), 3.0 | (2, ∊, 0.1) |
| 3 | (state, CA), 5.0 | (4, ∊, 0.1) |
| | (state, AZ), 5.0 | (4, ∊, 0.1) |
| | (age, r3), 1.0 | (4, ∊, 0.1) |
| | (age, r4), 3.0 | (4, ∊, 0.1) |
| | (income, 6), 3.0 | (4, ∊, 0.1) |
| 4 | (state, CA), 5.0 | (5, ∊, 0.1) |
| | (state, AZ), 5.0 | (5, ∊, 0.1) |
| | (age, r3), 1.0 | (5, ∊, 0.1) |
| | (age, r4), 3.0 | (5, ∊, 0.1) |
| | (income, 6), 3.0 | (5, ∊, 0.1) |
| | (gender, F), 3.0 | (5, ∊, 0.5) |

Figure 4:
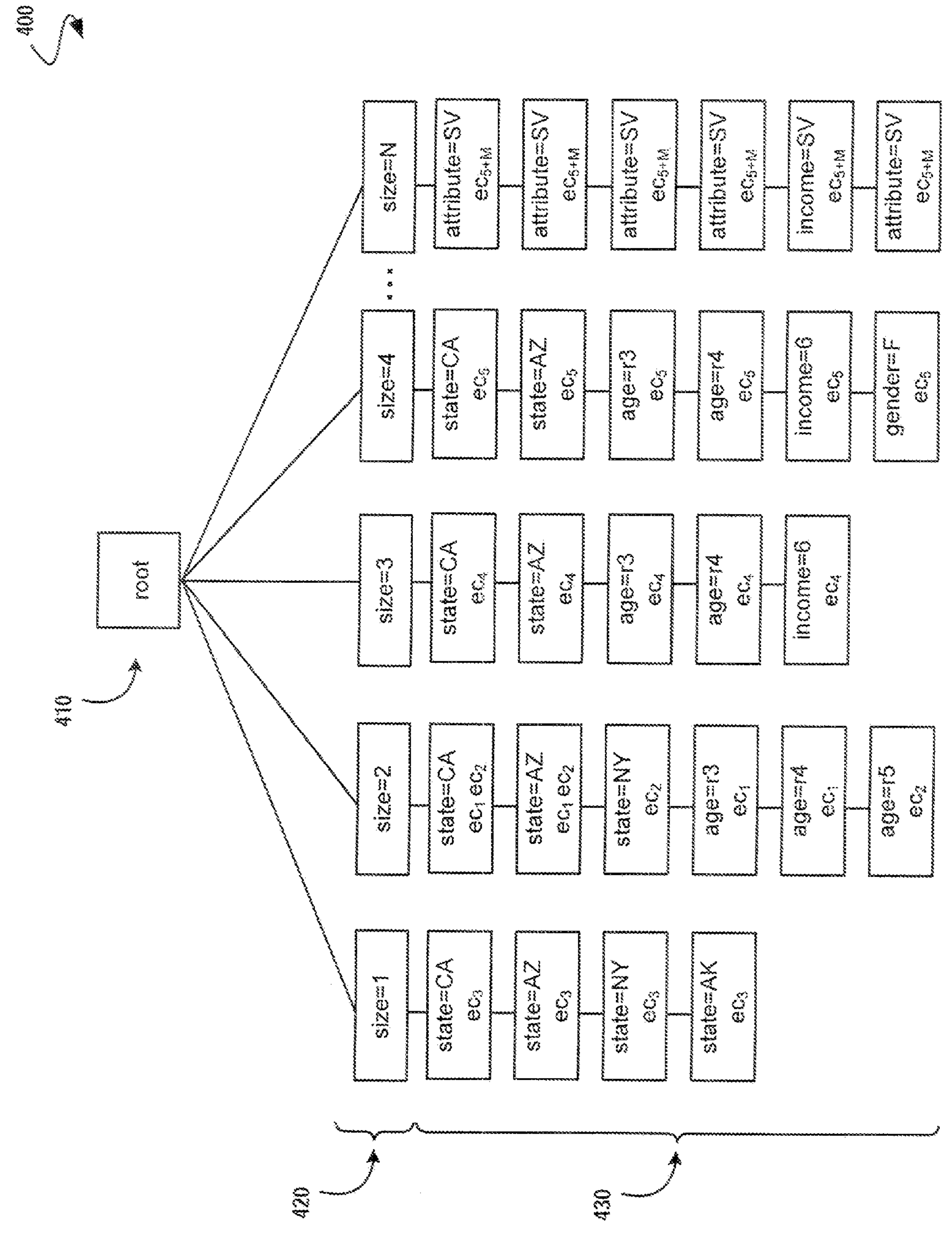
FIG. 4 is a hierarchical representation of an inverted index, according to one embodiment.

FIG. 4 is a hierarchical representation of an inverted index 400. As shown, the hierarchical representation of the inverted index follows the index as represented in Table 15. The inverted index 400 includes a root 410, and also contains nodes corresponding to the size of contracts as measured by number of conjunctions (see the conjunct hierarchical level 420). Under each value for size (e.g. size=1, size=2, size=3, . . . ) are the predicates of the conjunctions, together with the posting list of contracts that satisfy that predicate (see the posting list hierarchical level 430).

When a multi-valued opportunity impression profile predicate is received for query against the inverted index, the multi-valued opportunity impression profile predicate is processed as follows:

A query parser retrieves a list of which attributes are known to be multi-valued A query parser looks for multi-valued attributes in the query and, for each of those, creates an OR expression.

For instance, given the query (state IN {CA,AZ} ^ age IN {r3,r5} ^ income=6), the following query would be created (AND (OR (state=CA, state=AZ), OR (age=r3, age=r5)), income=6). In this example income is not a multi-valued attribute. The query of this example may be represented as a two-level Boolean tree, where the first level is an AND and the second level includes one OR per multi-valued attribute (i.e. the multi-valued attributes state and age) and one leaf node for each attribute that is not multi-valued (i.e. the single-valued attribute income).

Following this solution, counting the number of occurrences under the top AND node as conjunctions produces the correct results when contracts are indexed and retrieved according to the WAND Algorithm. For instance, the reconstructed query (AND (OR (state=1, state=2), OR (age=3, age=5)), income=6) would return Example Contract EC4. This technique efficiently processes multi-valued attributes in impression opportunity profile predicates when retrieved from the above-described inverted index of contracts. Moreover, this technique does not require an index of contracts formed using expansion into constituent conjunctive normal form predicates to represent the contract's multi-valued attributes.

Figure 5:
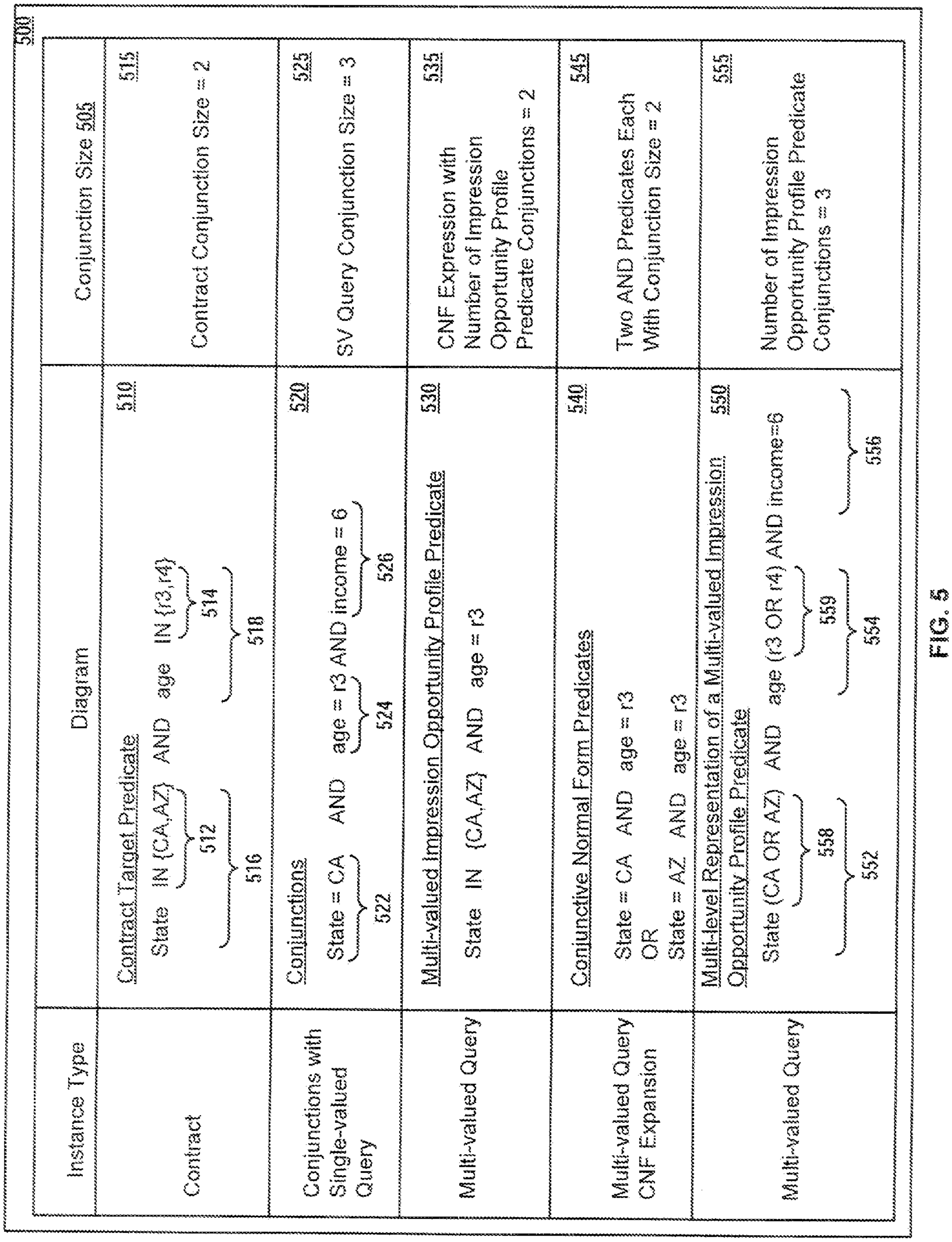
FIG. 5 is a chart with diagramming and annotation of predicates used in a system for matching contracts to a multi-valued impression opportunity profile predicate, according to one embodiment.

FIG. 5 is a chart with diagramming and annotation of predicates used in a system for matching contracts to a multi-valued impression opportunity profile predicate. As shown, the propositional logic diagram 500 illustrates various instances of predicate diagrams with corresponding conjunction size 505. For example, the contract target predicate 510 is shown in the same row as its corresponding contract conjunction size 515. According to the index construction techniques of the WAND Algorithm, this contract target predicate 510 would be indexed with a counting size of 2 (i.e. conjunction size=2). That is, this contract target predicate 510 is composed of an IN operator with multi-value attribute operands for state 512, and an IN operator ith multi-value attribute operands for age 514. These operators (and their operands) are combined by virtue of the AND operator as conjuncts, namely, the conjunct for the state attribute 516 and the conjunct for the age attribute 518. As earlier described, an attribute value might be representative of a range of values, thus the value r3 as expressed in the conjunct for the age attribute might refer to an age range (e.g. 18-24 years of age). Also shown and annotated is a single-valued query 520 having three conjuncts, each described using single-valued attribute operands, namely the conjunct for state being CA 522 and the conjunct for age being r3 524, and the conjunct for income being 6 526. Thus the single-valued query conjunction size 525 is 3 (as shown) and using this single-valued query 520 with the WAND Algorithm returns the correct contracts.

The propositional logic diagram 500 also shows a multi-valued query, specifically a multi-valued impression opportunity profile predicate 530. Such an expression might be formatted into conjunctive normal form predicates 540. In this case, representation as conjunctive normal form predicates results in an expansion into two AND predicates, with each of the two AND predicates having a conjunction size of 2 (see 545). As earlier indicated, reformatting using this expansion technique may result in large representations (e.g. many predicates in the expansion) as the number of multi-valued attributes and their values increases. Thus in one embodiment, preparing the multi-level representation does not include expanding the impression opportunity profile predicate into constituent conjunctive normal form predicates (which may result in a large number of conjunctive normal form predicates) and, instead, employs one or more of the herein disclosed techniques.

The propositional logic diagram 500 also shows exemplary results of the herein disclosed techniques for multi-level predicate representation. Specifically, the multi-level representation of a multi-valued impression opportunity profile predicate 550 is shown as having a first level of the multi-level representation indicating the number of impression opportunity profile predicate conjunctions. In this example, the count of the expressions at the first level (i.e. 552, 554, and 556) indicates the number of impression opportunity profile predicate conjunctions (see 555). The multi-level representation of a multi-valued impression opportunity profile predicate 550 can be further described as having a second level of the multi-level representation that represents at least one multi-valued predicate. In this example, the second level is comprised of the parenthesized OR expressions, namely 558 and 559.

Figure 6:
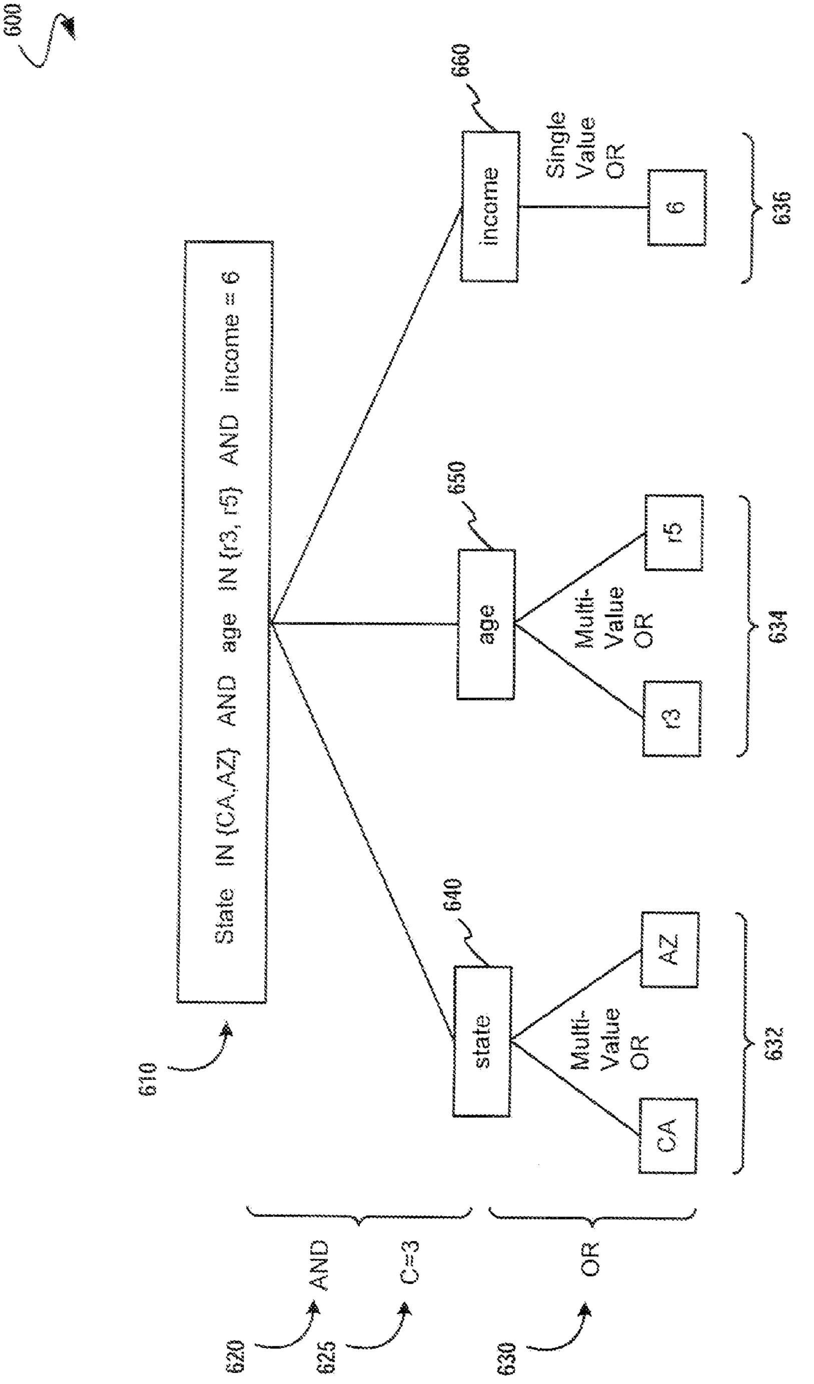
FIG. 6 is a tree-oriented representation of a multi-valued impression opportunity profile predicate used in a system for matching contracts to a multi-valued webpage profile impression opportunity profile predicate, according to one embodiment.

FIG. 6 is a tree-oriented representation of a multi-valued impression opportunity profile predicate used in a system for matching contracts to a multi-valued webpage profile impression opportunity profile predicate. As shown, the multi-level representation is in the form of a tree-oriented representation of a multi-valued impression opportunity profile predicate 600. Shown at the root of the tree is a multi-valued impression opportunity profile predicate 610 that branches into a first level of tree-oriented AND nodes 620 representing conjuncts and a second level of tree-oriented OR nodes 630 representing the multi-valued predicate (state=CA OR state=AZ) 632 as an OR node, and the multi-valued predicate (age=r3 OR age=r4) (see 634) as an OR node. The second level also represents the single-valued predicate income=6 (see 636). Those skilled in the art will recognize that OR(X) equals X. Thus a single-valued predicate income=6 is logically identical to OR(income=6). Also shown is the indication of the number of predicate conjunctions 625, which indication is used in index retrieval operations.

In further detail, FIG. 6 presents an AND/OR tree in the multi-level, alternating AND/OR tree form as described above. As shown, tree 600 depicts a multi-level representation of a multi-valued impression opportunity profile predicate 610, wherein the multi-level representation has a first AND level of representation (see AND nodes 620) having impression opportunity profile predicate conjunctions, and wherein the multi-level representation has a second level of representation (see OR nodes 630) that represents at least one multi-valued predicate (see 632, see 634). The tree may be constructed from an impression root node corresponding to an impression opportunity (e.g. a multi-valued impression opportunity profile predicate 610), from which impression root node any number of conjunction child nodes (e.g. the state node 640, the age node 650, and the income node 660). Constructing the tree-oriented multi-level representation of a multi-valued impression opportunity profile predicate 610 continues by adding an OR level with multi-valued predicates (i.e. depicting the multi-valued IN operator arguments corresponding to the profile predicate conjunctions of the AND level). In the example of FIG. 6, the multi-value possibilities are state=CA and state=AZ as possible values of the state node 640; age=r3, and age=r4 as possible values of the age node 650; and income=6 as a possible value for income node 660.

Figure 7:
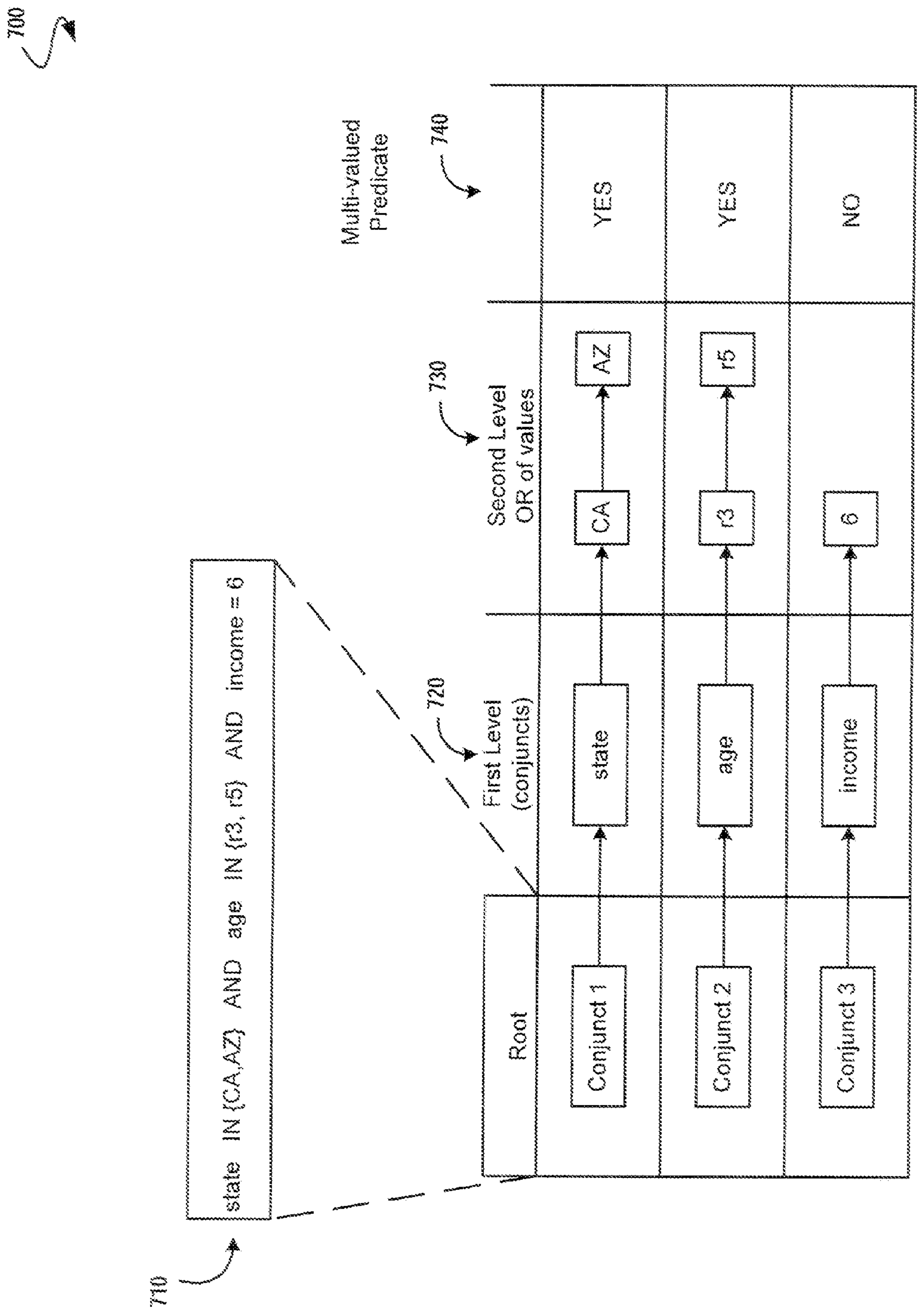
FIG. 7 is a list-oriented representation of a multi-valued impression opportunity profile predicate used in a system for matching contracts to a multi-valued webpage profile impression opportunity profile predicate, according to one embodiment.

FIG. 7 is a list-oriented representation of a multi-valued impression opportunity profile predicate used in a system for matching contracts to a multi-valued webpage profile impression opportunity profile predicate. As shown, the multi-level representation is a list-oriented multi-valued impression opportunity profile predicate 700. Shown is a root containing heads of lists, pointing to list elements for describing a multi-valued impression opportunity profile predicate 710. The heads of the lists point to a first level of list-oriented nodes representing conjuncts 720, which nodes in turn point to a second level of list-oriented nodes representing multi-valued predicates 730. Strictly for illustrative purposes, the characteristic of the multi-valued predicate is shown as YES/NO in column 740.

Figure 8:
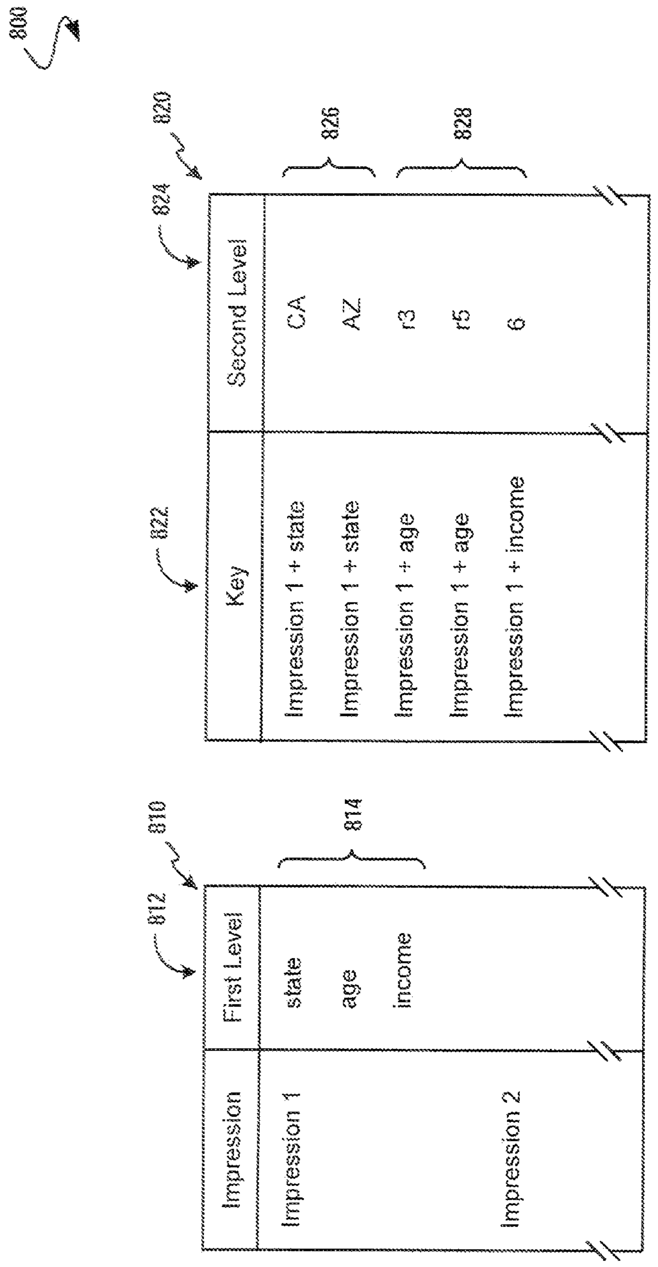
FIG. 8 is a relation-oriented representation of a multi-valued impression opportunity profile predicate used in a system for matching contracts to a multi-valued webpage profile impression opportunity profile predicate, according to one embodiment.

FIG. 8 is a relation-oriented representation of a multi-valued impression opportunity profile predicate used in a system for matching contracts to a multi-valued webpage profile impression opportunity profile predicate. As shown, the multi-level representation is in the form of a relation-oriented multi-valued impression opportunity profile predicate 800. The relation 810 relates a multi-valued impression opportunity profile predicate to a first level of relation-oriented entries 812 representing conjuncts 814. A second relation 820 relates a key 822 with a second level of relation-oriented entries 824 representing multi-valued predicates. As shown, the second level uses relation-oriented entries for representing the multi-valued predicate (state=CA OR state=AZ) 826 as entries interpreted as an OR entry, and the multi-valued predicate (age=r3 OR age=r4) 828 is also interpreted as an OR entry. The second level also represents the single-valued predicate income=6.

Figure 9:
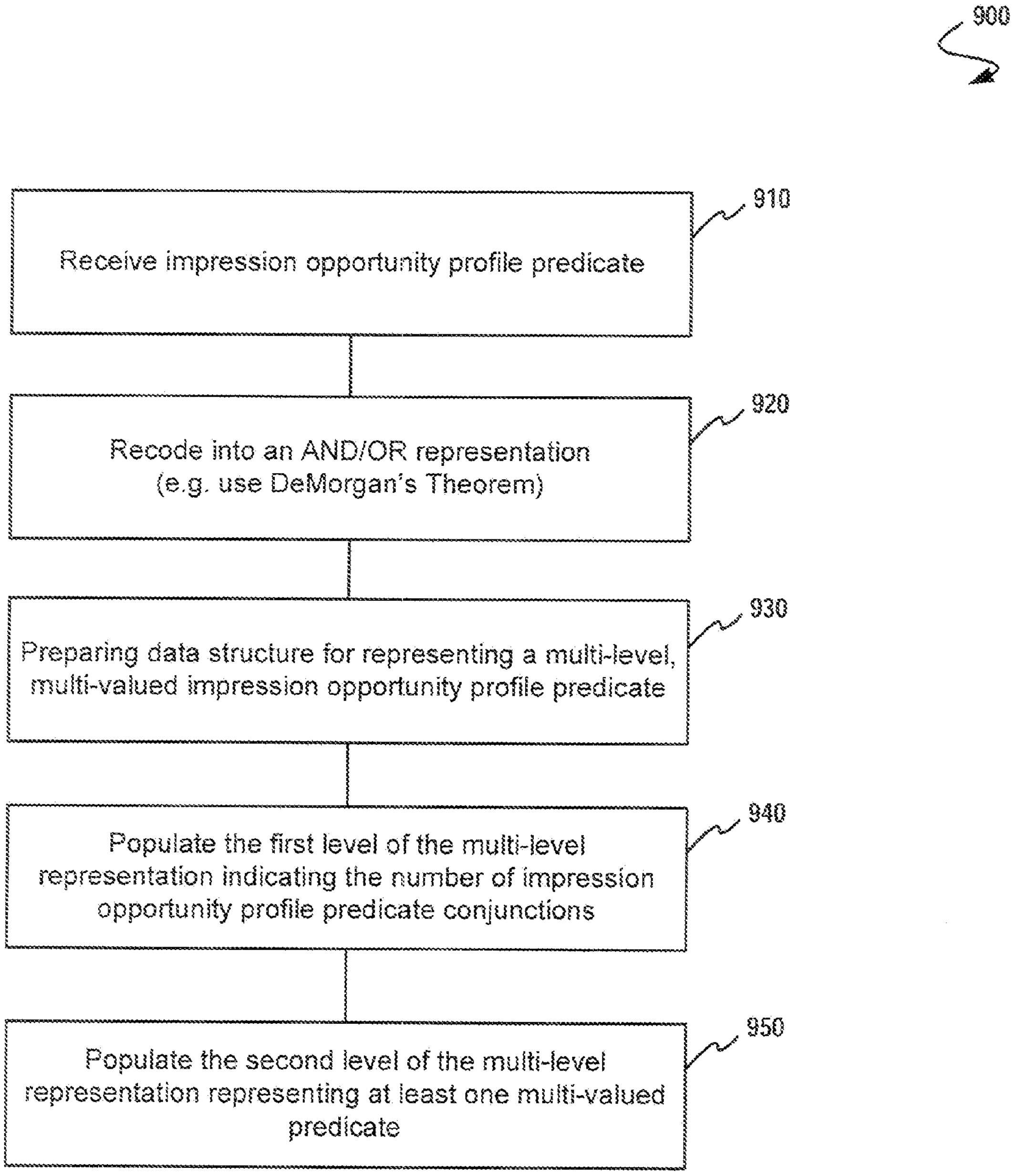
FIG. 9 is a flowchart for preparing a multi-level representation of a multi-valued impression opportunity profile predicate, according to one embodiment.

FIG. 9 is a flowchart for preparing a multi-level representation of a multi-valued impression opportunity profile predicate. As shown, said multi-level representation having a first level of the multi-level representation indicating the number of impression opportunity profile predicate conjunctions, and having a second level of the multi-level representation representing at least one multi-valued predicate. In the example shown as method 900, the method might commence by receiving an impression opportunity profile predicate (see step 910) which is then recoded into an AND/OR representation (see step 920) for subsequent preparation of a data structure (see step 930). Method 900 proceeds to populate the first level of the multi-level representation indicating the number of impression opportunity profile predicate conjunctions (see step 940), followed by steps to populate the second level of the multi-level representation representing at least one multi-valued predicate (see 950). Using such a method a tree-oriented representation of a multi-valued impression opportunity profile predicate such as shown in FIG. 6 may be constructed, and used in a system for matching contracts to a multi-valued webpage profile impression opportunity profile predicate.

In some embodiments, the system 150 might host a variety of modules to serve for preparing a multi-level representation of a multi-valued impression opportunity profile predicate pertinent to contract delivery methods. For example, system 150 might include an impression and contract tree construction module 116 that cooperates with any other modules of system 150 to advantageously match contracts to impression opportunities, for example the matching and projection module 117.

Section VIII: Automatic Matching of Contracts in an Inverted Index to Impression Opportunities Using Complex Predicates and Confidence Threshold Values In embodiments of the system 150, components of the additional content server, including modules for automated bidding management 114 and admission control and pricing module 115 perform processing such that, given an ad opportunity (e.g. an impression opportunity profile predicate), processing determines which (if any) contracts matching the ad opportunity. Hereinabove are disclosed techniques for efficiently retrieving contracts matching a given impression opportunity from an inverted index when given conjunctions (see the Counting Algorithm and the WAND Algorithm). The intuition behind these algorithms is to efficiently eliminate contract evaluation for matching attribute-value pairs based on the count of the number of matching attribute-value pairs for a given conjunction. For instance, the impression opportunity predicate (state IN {CA,AZ} AND age IN {r3, r4}) has a conjunct size of 2. This means that during an impression opportunity query evaluation, only contracts that contain two or fewer conjunctions need be evaluated.

However, in some cases, the assignment of a value to an attribute may be based on statistical confidence rather than on certitude. For example, a data gathering and statistics module 112 might accurately report that there are one million drivers of imported automobiles. However such a report might have been based on a small sample population. And the sample data might only indicate which drivers are male and which are female within a statistically accurate +/−20% margin of error. Thus the data might be reported as $driver_{imported}$="male" {confidence 30%} and/or $driver_{imported}$="female" {confidence 30%}. Given that the certainty of a data point in a multi-dimensional space may be qualified with a confidence measure, it follows that a contract might express permittivity for matching impressions. In the context of advertising contracts, an advertiser might seek a target that is codified by either a single-value attribute predicate or multi-value attribute predicate (i.e. as described above). However, such a predicate (e.g. {state=California} might be more specific than desired by an advertiser based on the border of California and Arizona. For example, an advertiser based in California might be inclined to dedicate advertising resources to reach targets who are in Arizona—so long as there is a high likelihood (as defined by the advertiser) that the target meets other demographic criteria.

As just described, a confidence value may be defined by an advertiser in order to codify acceptable permittivity into a targeted advertising campaign. Of course the characterization of an impression opportunity profile may be subject to uncertainty or statistical variance. For example, characterization of a particular user corresponding to an impression opportunity profile might include an attribute for an educational degree (e.g. B.A., B.S., M.S.E.E., Ph.D., etc). In the case that the user's degree status was retrieved from the database of an accredited institution of higher learning, the confidence might be relatively high. Conversely, in the case that the user's degree status was retrieved from a social networking site, the confidence might be relatively lower. A data gathering and statistics module 112 might report that a particular user is domiciled in California with a 95% confidence, but only a 50% confidence the user is domiciled in San Francisco, Calif. Accordingly techniques are herein disclosed for efficiently retrieving matching contracts where matching includes matching based on both the predicates and also the confidence corresponding to the predicates.

One approach extends the inverted index construction techniques described in the Counting Algorithm and the WAND Algorithm to add confidence measures to the inverted index data structure while preserving the efficiency in retrieving contracts matching an impression opportunity profile predicate.

EXAMPLE

Consider the Example Contracts listed below, for which contracts their corresponding identifiers and predicates are shown in Table 16.

TABLE 16

| A set of contracts | |
|---|---|
| Contract | Expression |
| $ec_6$ | gender ∈ {M}{70%} ∧ (state ∈ {CA} {50%} ∧ state ∈ {AZ}{60%}) |
| $ec_7$ | state ∈ {AK}{75%} |

For impression $I_1$: (gender=M{75%}, state=AZ{50%}, state=CA {60%}, state=AK{74%}), evaluation of the impression $I_1$ against the contracts of Table 16, contract $ec_6$ would be a valid match while $ec_7$ would not be a match. Embodiments of the invention extend the inverted index construction techniques described in the Counting Algorithm and the WAND Algorithm to add confidence measures to the inverted index data structure while preserving the efficiency in retrieving contracts matching an impression opportunity profile predicate. In one embodiment, confidence values are stored in the inverted index along with the contract identification in a posting list for a particular predicate.

Figure 10:
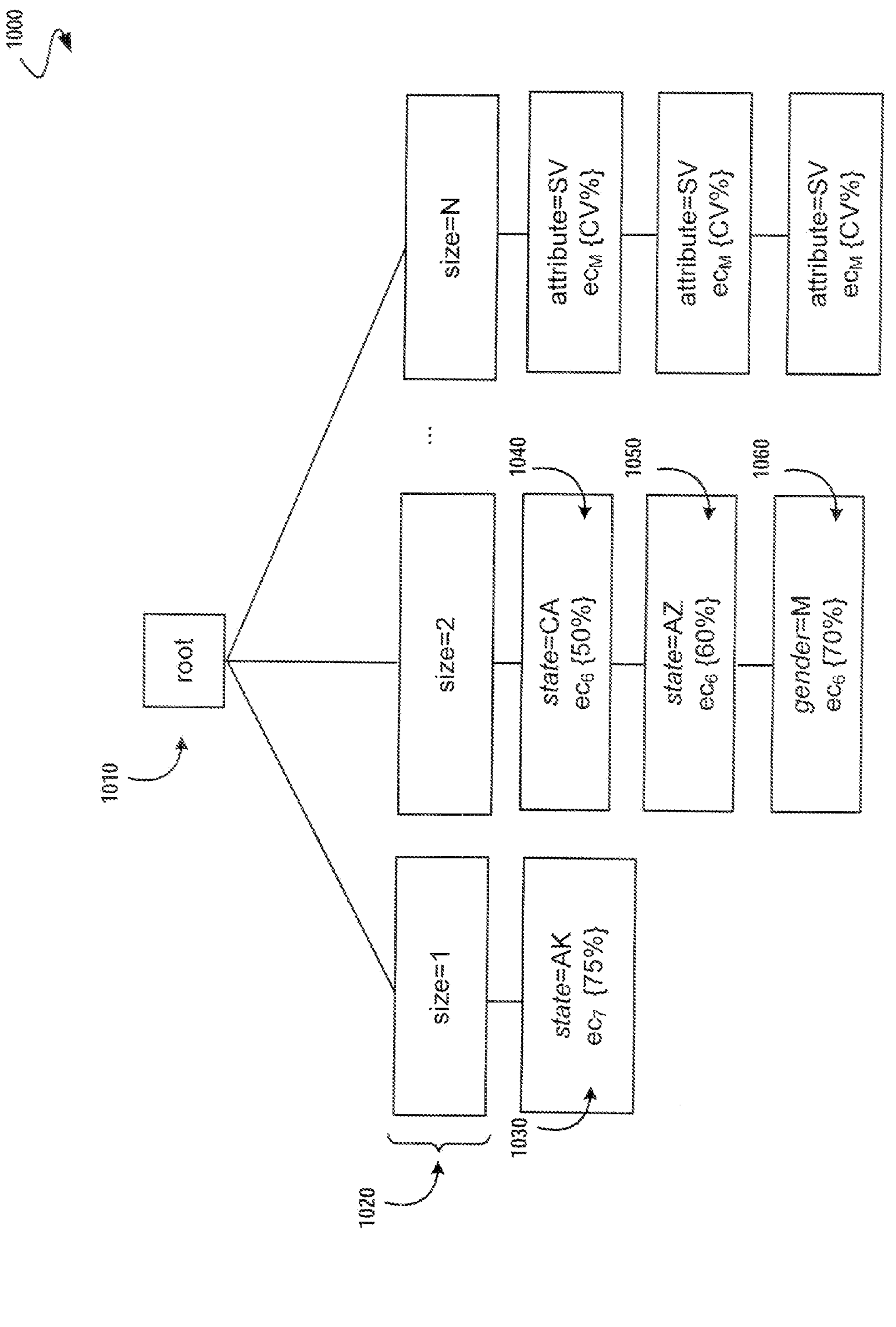
FIG. 10 is a hierarchical representation of an inverted index with confidence value indications in the posting lists, according to one embodiment.

FIG. 10 is a hierarchical representation of an inverted index with confidence value indications in the posting lists. As shown, the hierarchical representation of the inverted index 1000 includes a root 1010 and nodes corresponding to the size of contracts as measured by the number of conjunctions (see the conjunct hierarchical level 1020). Under each value for size (e.g. size=1, size=2 . . . , size=N) are the predicates of the conjunctions, together with the posting list of contracts that satisfy that predicate and confidence value for each predicate. As shown, confidence values are represented as percentages within brackets appended to the posting list contract identification. For example, the confidence value {75%} is appended to the posting list entry for $ec_7$ (see 1030). Confidence values might be encoded and/or stored with the posting list entry, or confidence values might be stored with the posting list entry as a memory pointer (see the posting list at 1040, 1050, and 1060). In some embodiments, confidence values for each conjunct may be stored as a literal, directly in the index. In other embodiments, confidence values might be stored in the forward index which stores per-document data, or the confidence values for each conjunct may be stored in a related document accessible from the index via a memory pointer or indirection.

Embodiments of the invention define one or more query evaluation operators. For example, a query operator might be described as IN_THRESHOLD. In this embodiment, the IN_THRESHOLD operator takes as input parameters: (a) a contract C with contract C having confidence values included in the herein-described inverted index, and C having a set of predicates P with confidence values V; (b) an impression query Q having a set of predicates with confidence values J; and (c) a function F.

The operator IN_THESHOLD(C, Q, F) evaluates to TRUE if and only if:

- C is a valid contract for impression Q without considering the confidence values, and
- For at least one of the predicates $P_i$, $P_i \in P$ with confidence values $J_i$, $J_i \in J$ valid for impression Q, after assigning the query confidence values to the terms of $J_i$, $F(J_i)$ is greater than $V_i$, where $V_i$ is the confidence value for the predicate specified in the contract.

For instance, consider the two contracts of Table 16 and impression (gender=M{75%}, state=AZ{50%}, state=CA{60}, state=AK{74%}), and if F=sum (i.e. the arithmetic operator sum), then:

- IN_THESHOLD(C=$c_6$, Q=$I_1$, F=sum) evaluates to TRUE since $c_6$ is a valid contract for impression $I_1$ without considering confidence values, and at least the predicate gender∈{M} {70%}, after assigning the query confidence value to the terms, the value F=sum(75%) is greater than the confidence value for the predicate specified in the contract (i.e. 70%).
- IN_THESHOLD(C=$c_7$, Q=$I_1$, F=sum) evaluates to FALSE since even though $c_7$ is a valid contract for impression $I_1$ without considering confidence values, since after assigning the query confidence value to the terms, the value F=sum(74%) is not greater than the confidence value for the predicate specified in the contract (i.e. 75%).

As described, if C is a valid contract for impression Q without considering the confidence values, then only one of the arithmetic thresholds corresponding to a contract predicate need be satisfied by the impression in order for the operator IN_THESHOLD(C, Q, F) to be satisfied.

Again consider the two contracts of Table 16 and impression $I_2$: (gender=M{50%)}, state=AZ{60%}, state===CA {60%}, state=AK{74%}), and if F=sum (i.e. the arithmetic operator sum), then:

- IN_THESHOLD(C=$c_6$, Q=$I_2$, F=sum) evaluates to TRUE since $c_6$ is a valid contract for impression $I_1$ without considering confidence values, and at least one contract predicate (e.g. (state ∈{CA})), after assigning the query confidence value to the terms, the value F=sum(60%) is greater than the confidence value for the predicate specified in the contract (i.e. 50%).

As another example, consider the two contracts of Table 16 and impression $I_3$: (gender=M{50%}, state=AZ{59%}, state=CA {49%}), and if F=sum (i.e. the arithmetic operator sum), then:

- IN_THESHOLD(C=$c_6$, Q=$I_3$, F=sum) evaluates to FALSE even though $c_6$ is a valid contract for impression $I_1$ without considering confidence values, there are no contract predicates for which, after assigning the query confidence value to the terms, the value F=sum (in this example, 60%) is greater than the confidence value for the predicate specified in the contract (in this example, 50%).

In various embodiments of the invention, the operator IN_THRESHOLD can be efficiently implemented using an inverted index. More specifically, a threshold value for a contract term may be represented in the index as a literal numeric value, or as a numeric value accessed through one or more levels of indirection. In some embodiments, a threshold value is represented as an integer between zero and 100 (i.e. representing a percentage), or as a real number between 0.0 and 1.0 (i.e. representing a percentage), or as any other representation that can yield the value of a percent.

Using an inverted index as shown and described in FIG. 10, the candidate contracts to be evaluated by operator IN_THESHOLD(C, Q, F) can be retrieved as follows:

- Access the inverted index with impression I to return each satisfied predicate (with the contract threshold) along with the posting list (i.e. the posting list containing candidate contracts for evaluation).
- Find the contracts in the posting list such that only contracts that can be satisfied by the impression remain (i.e. remove any contracts that cannot be valid for impression I).
- For each remaining contract, evaluate F.

EXAMPLE

For example, given the impression $I_4$: (gender=M {75%}, state=AZ{50%}, state=CA {60%}, state=AK {76%}), and if F=sum (i.e. the arithmetic operator sum), then:

Accessing the inverted index corresponding to Table 16 for matching against impression $I_4$ (without considering confidence values) would yield contracts $ec_6$, and $ec_7$ with satisfied contract predicates and their corresponding contract thresholds: $c_6$ having gender=M{70%}, state=CA{50%,}, state=AZ{60%}; and $c_7$ having state=AK{75%}.

Finding the contracts in the posting list such that only contracts that can be satisfied by the impression remain (i.e. remove any contracts that cannot be valid for impression I) would not remove any contracts, since $c_6$ and $c_7$ are both valid contracts for impression $I_4$ without considering the confidence values.

For each remaining contract (since $ec_6$ and $ec_7$) evaluate F over the predicates:

For $ec_6$, evaluate the first contract predicate gender=M{70%} against the corresponding term in the impression, namely gender=M{75%}, which is satisfied. Since in evaluating the IN_THRESHOLD operator only at least one of the contract predicates must be satisfied for the threshold arithmetic function F, THRESHOLD($ec_6$, $I_4$, sum) is TRUE (even before evaluating any other contract predicates).

For $ec_7$, evaluate the first contract predicate state=AK{75%} against the corresponding term in the impression, namely state=AK{75%}, which is not satisfied since in evaluating the IN_THRESHOLD operator, after assigning the query confidence value to the terms, the value F=sum(75%) is not greater than the confidence value for the corresponding predicate specified in the contract (i.e. 75%).

Notation:

The correspondence of a confidence value may be noted using the bracket notation where confidence values are represented as percentages within brackets appended to a predicate (e.g. state=AK{74%}). In an alternative notation, the correspondence of a confidence value may be noted using the bracket notation where confidence values are represented as percentages within brackets appended to the posting list contract identification (as shown in FIG. 10). In still other situations, the correspondence of a confidence value may be noted using the bracket notation where confidence values are represented as percentages within brackets appended to a list of predicates. For predicates $P_1, P_2, \ldots P_N$, $P_N \in P$, the correspondence of a confidence value CV to each predicate in P may be noted as $(P_1, P_2, \ldots P_N)$\{CV\}, or simply as (P){CV}, or simply as P{CV}, and the expansion of this notation is identical to ($P_1$ {CV}, $P_2${CV}, . . . $P_N${CV}).

Processing IN_THRESHOLD for Arbitrarily Complex Boolean Expressions:

The operator IN_THRESHOLD may be efficiently processed in the context of more complex Boolean expressions. In particular, and as disclosed herein, an arbitrarily complex expression may be represented as an AND/OR tree, having the highest level branches representing conjunctions for processing using the Counting Algorithm or the WAND Algorithm or variants. This means that it can be combined with other operators in the context of larger Boolean expressions.

Figure 11:
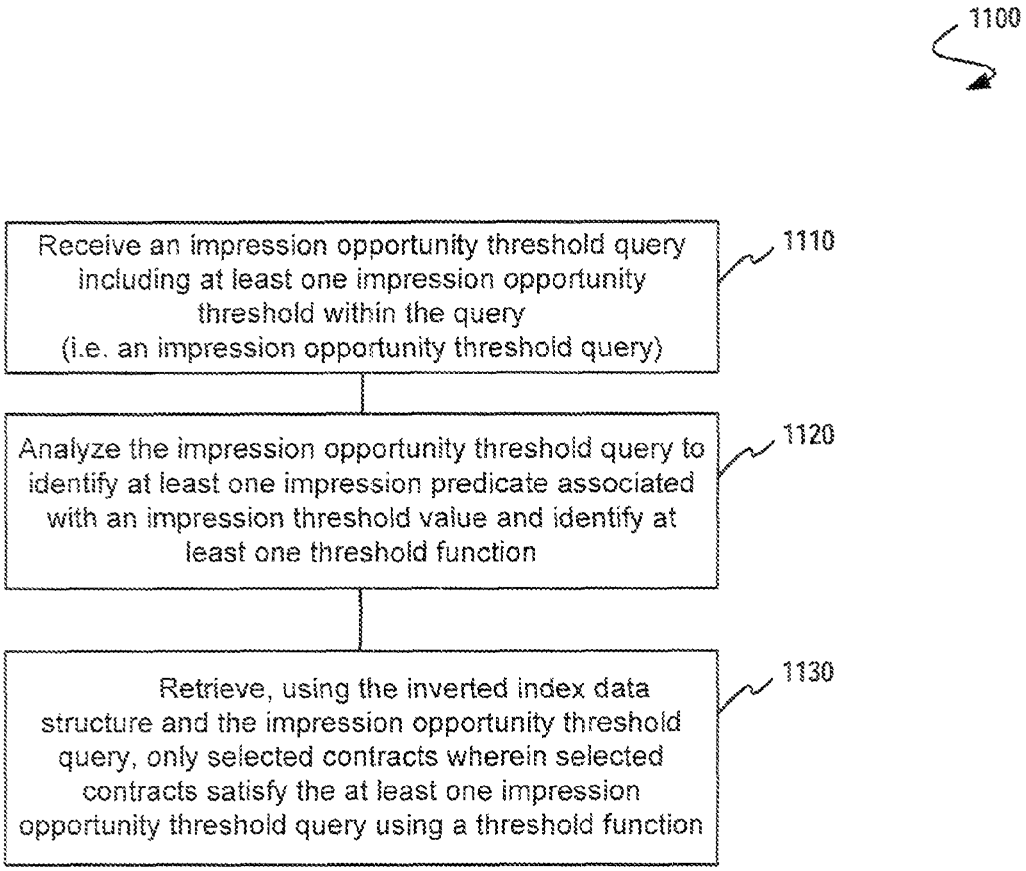
FIG. 11 is a flowchart of a method for indexing advertising contracts for matching to an impression opportunity profile predicate using a threshold, according to one embodiment.

FIG. 11 is a flowchart of a method for indexing advertising contracts for matching to an impression opportunity profile predicate using a threshold. As shown, the method is configured for receiving an impression opportunity threshold query including at least one impression opportunity threshold within the query (see step 1110), and analyzing the impression opportunity threshold query to identify at least one impression predicate associated with an impression threshold value and also identify at least one threshold function (see step 1120). In some embodiments, the threshold function may be implemented as a floor function or as a ceiling function. The method also includes a step for retrieving (in this embodiment, using an inverted index data structure and the impression opportunity threshold query) only selected contracts wherein selected contracts satisfy the at least one impression opportunity threshold query using a threshold function (see step 1130). The method 1100 may be practiced in the context of the foregoing, or it may be practiced in any environment. In some embodiments, a system 150 might host a variety of modules to serve for preparing a multi-level representation of a multi-valued impression opportunity profile predicate pertinent to contract delivery methods. For example, system 150 might include an impression and contract tree construction module 116 that cooperates with any other modules of system 150 for advantageously matching contracts using a fixed-length complex predicate representation, for example, using the matching and projection module 117.

Section IX: Automatic Matching of Contracts Using a Fixed-Length Complex Predicate Representation As earlier disclosed in the discussion of system 150, in the case of online Internet advertising, an item of inventory (e.g. an impression) might be specified in an arbitrarily complex description that might involve dozens, or hundreds or even more attributes and values, which attributes and values are to be matched to one or more matching contracts. A system 150 may be configured to include an ad server and admission control module in order to answer the following fundamental question: "Given an ad opportunity, what are the contracts matching it?" Hereinabove is disclosure of how to build such an index when opportunities are specified by arbitrarily complex contracts (e.g. stored as arbitrarily complex Boolean expressions) without converting the contracts to CNF or DNF. This allows for both faster retrieval (due to quicker evaluation of contracts), while at the same time having lower space usage. Some retrieval techniques include use of a numbering scheme to represent nodes in this tree whereby the numbers representing the nodes are variable length. Retrieval using variable length node representations may include interpretation (i.e. a processing-intensive step) of the variable length number. Moreover, the selection of certain characteristics of the numbering scheme imposes corresponding limitations. In some cases, the use of a variable length numbering scheme imposes limits on the height of the tree and/or on the maximum number of children allowed by any node. As the number of predicates upon which to match increases, processing involving variable number interpretation in retrieval operations also increases. Thus, in embodiments of the current invention, techniques for indexing arbitrarily complex Boolean expressions based a fixed length representation for each node in the tree are used. Moreover, the retrieval techniques disclosed herein support retrieval of all contracts that satisfy the predicates of an opportunity. That is, given an impression opportunity A specified as a vector V of (feature, value) pairs, the retrieval techniques disclosed herein may be configured to return all of the contracts that match this opportunity. For example, given an impression opportunity profile specified as a vector of feature-value pairs, the impression opportunity $A_0$ {(state=IN{CA,AZ} AND age IN {r4, r4} AND income=6}, possible matching contracts are any of those contracts asking for users from CA or AZ, contracts asking for users in age range r3 or age range r4 AND income=6.

Using the techniques herein, contracts expressed as arbitrarily complex Boolean expressions can be handled efficiently without converting to much larger CNF or DNF formulas.

Figure 12:
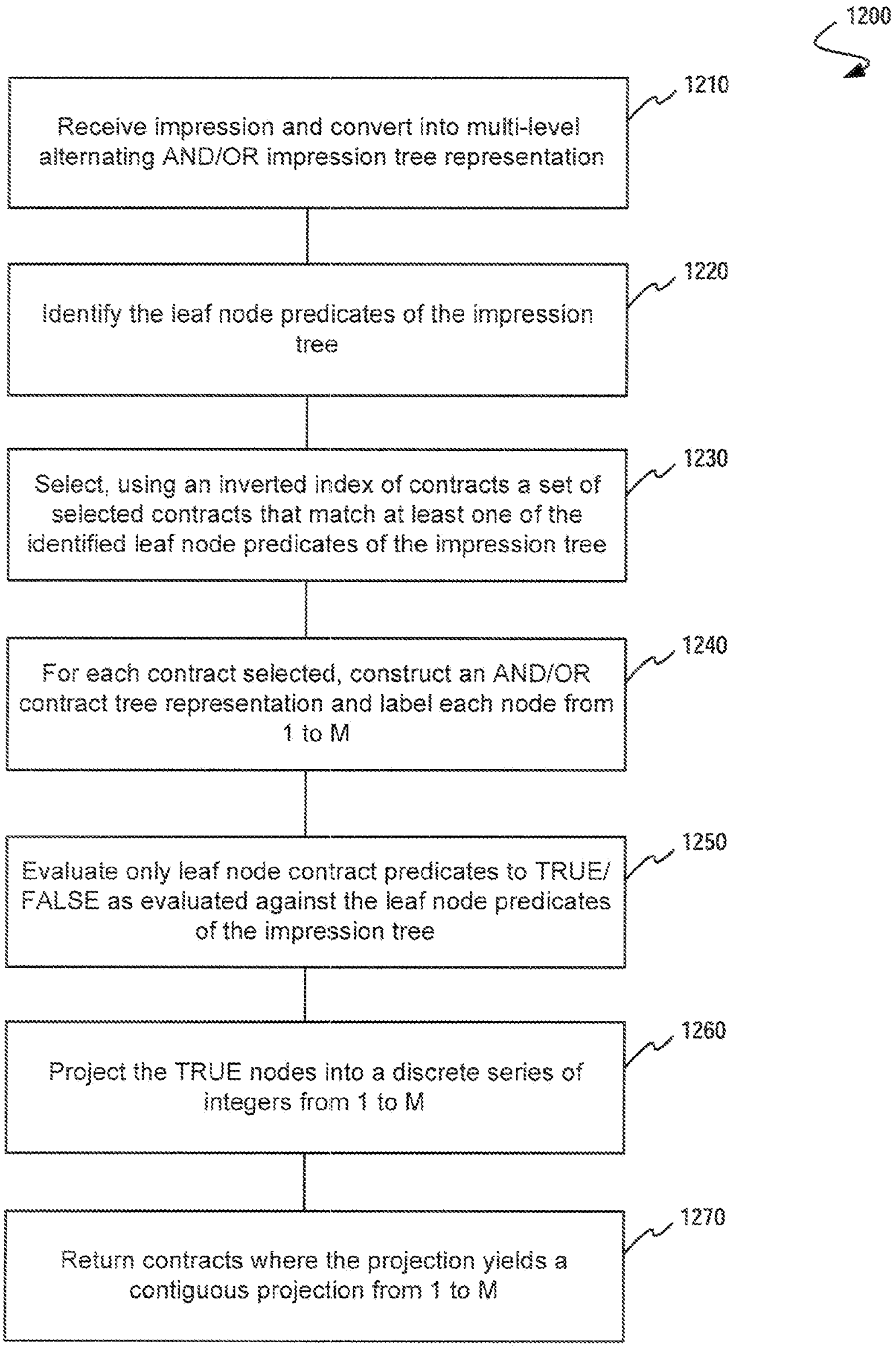
FIG. 12 is a depiction of a method for matching of contracts using a fixed-length complex predicate representation, according to one embodiment.

FIG. 12 is a depiction of a method for matching of contracts using a fixed-length complex predicate representation. As shown, processing may commence when a system practicing the method receives an impression (e.g. in the form of a complex predicate), and converts the predicate into a multi-level alternating AND/OR tree representation (see step 1210). It is understood that the received impression may be received in any form of a complex predicate, possibly in DNF, or possibly in CNF, or possibly in any form of arbitrary Boolean expression. It is further understood that any arbitrarily complex Boolean expression may be reformatted into an alternating AND/OR tree representation, possibly using De Morgan's Theorem and/or other Boolean logic. Given this alternating AND/OR representation, the leaf nodes of the tree comprise predicates suitable for use in retrieval from an inverted index. Thus, the operation of step 1220 identifies the leaf node predicates of the impression tree predicates (see step 1220). Processing continues by selecting (possibly using an inverted index of contracts) a set of selected contracts that match at least one of the identified leaf node predicates of the impression tree (see step 1230). It should be emphasized that any form of index of contracts may be used, and the selecting operation might be an aspect of a retrieval procedure using an index of contracts. For example, a retrieval operation might include filtering the retrieval set to return only contracts that surpass some threshold (e.g. a threshold of a particular dollar value), or a retrieval process that filters out all but only a specified number of topmost valuable contracts, etc. Or, the selecting process might be a filtering process applied to contracts after retrieval from the index.

As shown in step 1240, for each contract selected, construct an AND/OR contract tree representation and label each node from 1 to M. Evaluate only leaf node contract predicates to TRUE/FALSE as evaluated against the leaf node impression predicates of the impression tree (see step 1250). That is, for each contract tree leaf node contract predicate, compare the required predicate (e.g. gender IN(Male)) against the impression tree leaf node impression predicate for satisfaction (i.e. TRUE or FALSE), and mark the corresponding tree leaf node contract predicate (e.g. as TRUE). In some embodiments, including computer-implemented embodiments, the initial set of contract tree leaf node data structures are initialized to a FALSE value, and subsequently marked as TRUE when the evaluation against a corresponding impression tree leaf node predicate is determined to be TRUE.

The operations of step 1260 are for projecting (using the marked contract tree leaf node predicates) the label assigned to the marked contract tree leaf node predicates over a discrete set of ordered symbols (e.g. discrete series of integers on order from 1 to M). Various methods (e.g. list mapping, set operations, etc) are suited to project the TRUE nodes into a discrete series of integers from 1 to M (see step 1260). The operations of step 1270 check for a contiguous projection from 1 to M over the discrete series of integers from 1 to M, and return contracts where the projection yields a contiguous projection from 1 to M (see step 1270).

In this embodiment of the invention, the discrete series of integers from 1 to M is a particular species of the genus of a discrete set of ordered symbols. Use of integers is purely illustrative, and any discrete set of symbols that can be arranged into an order may be used. Moreover, representation of an integer or symbol need not be limited to a computer-implemented integer. A symbol might be represented as an element in a set, or even as a series of bits within a computer memory. It should be noted that some of the examples herein use a discrete set comprised of decimal (base 10) representations of integers from 1 through 15, plus the symbol M, which is ordered contiguously as {1, 2, 3, 4, 5, 6, 7, 8, 9, 10, 11, 12, 13, 14, 15, M}. It should further be noted that the discrete set over which the set of TRUE conjuncts is projected need not be the same discrete set between contracts. In fact, and as described herein as pertains to some embodiments, each contract selected in method step 1230 might be returned together with an annotation of a pair of {start, end} numbers describing its position in the inverted index, and that pair of {start, end} numbers might be used to select the lower and upper bounds of the aforementioned discrete set (e.g. using integer portions from the pair of {start, end} numbers, with all integers in between).

Now, using a sample case, the following paragraphs illustrate application of step 1210 through step 1270 as applied to the sample case of Table 17. Consider the following impression (and note the use of confidence measures and multi-valued IN predicates):

TABLE 17

Sample impression

| Clause | Comment |
|---|---|
| gender IN {Male} | single-valued IN predicate |
| topic IN {Life, News} | multi-valued IN predicate |
| income IN {50k-100k} | |
| clickHistory IN {Active} | |
| geo IN {Santa Clara {60%}, New York {99%}} | multi-valued IN predicate with confidence measures |

Figure 13:
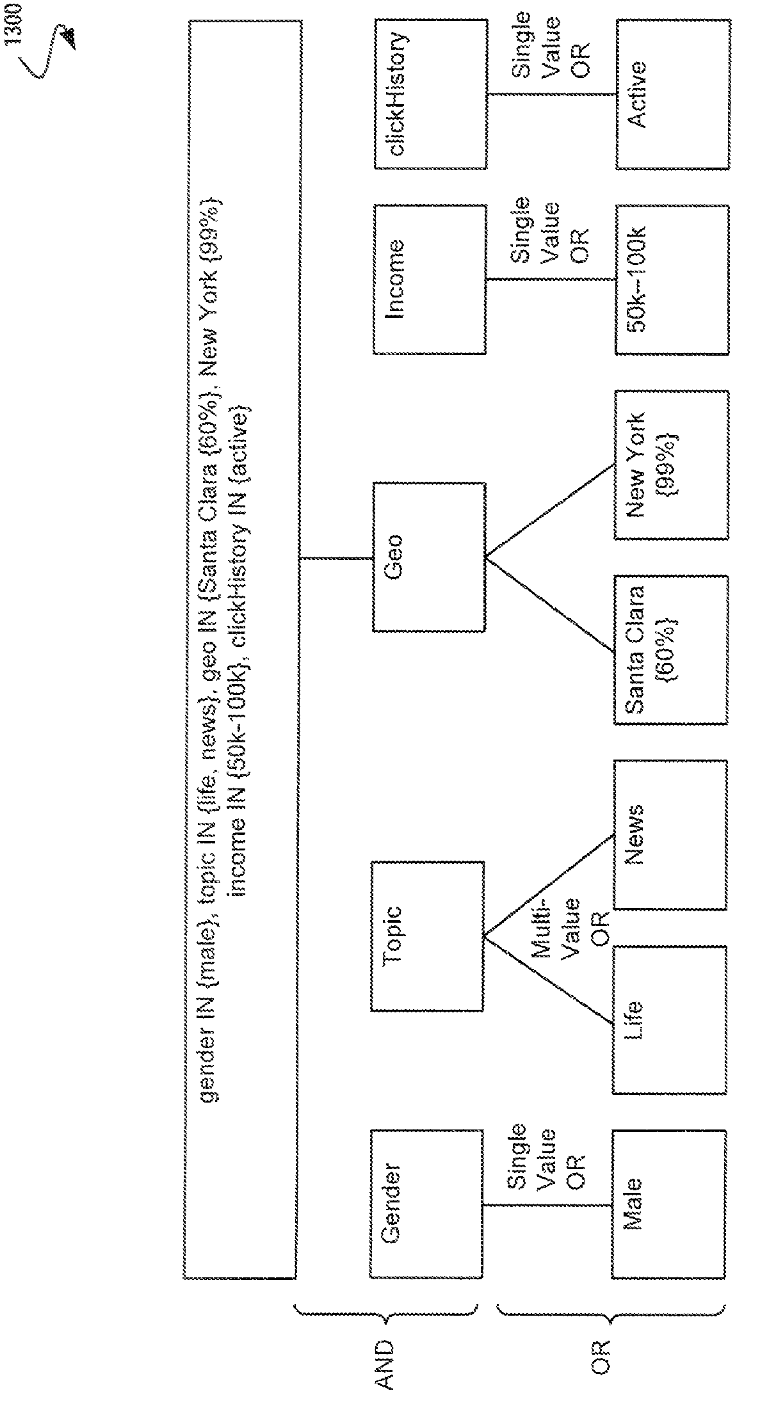
FIG. 13 is a depiction of an alternating AND/OR tree representation of an impression predicate, according to one embodiment.

FIG. 13 is a depiction of an alternating AND/OR tree representation of an impression predicate. As described supra, and as carried out in the operations of step 1210, the impression given in Table 17 may be converted into an AND/OR representation. As shown, the leaf node predicates are identified in the list below (also see step 1220).

gender IN {Male} topic IN {Life} topic IN {News} geo IN {Santa Clara {60%}} geo IN {New York {99%}} income IN {50 k-100 k} clickHistory IN {Active}

Such a list of lowest-level predicates are then used to query and retrieve from an inverted index (possibly using the conjunct-oriented retrieval techniques discussed above) contracts that have as a term any one of the lowest-level predicates (see step 1230). The set of contracts returned may include contracts that are not satisfied against the entire complex predicate of the impression, however techniques for identifying contracts that do satisfy the complex predicate of the impression are discussed infra.

In some embodiments, each contract selected in method step 1230 is returned together with an annotation of a pair of {start, end} numbers describing its position in the inverted index.

FIG. 14A and FIG. 14B, and FIG. 15, and FIG. 16 each depict a partially annotated AND/OR tree of a sample contract predicate. As shown, the trees each comprise alternating AND/OR levels, which correspond to the alternating AND/OR construction of the following contract predicate (see Sample Contract Predicate SCP).

| Sample Contract Predicate SCP |
|---|
| ((((geo IN_THRESHOLD (Santa Clara, Sunnyvale} {Confidence 50%}) OR (geo IN_THRESHOLD {Palo Alto} {Confidence 60%})) AND ((geo IN_THRESHOLD {California} (Confidence 70%}) OR (geo IN_THRESHOLD (West Coast} (Confidence 90%})) ) OR (geo IN_THRESHOLD {New York} {Confidence 98%})) AND (((((gender IN {Male}) AND (topic NOT__IN {Sports, Finance})) OR (topic IN {Life Insurance, Mortgage})) AND (((gender IN {Female}) AND (topic NOT__IN {Entertainment})) OR ((gender IN {Male, Female, Unknown}) AND (topic IN_THRESHOLD {Banking} {Confidence 95%})))) OR (income IN {100k-200k, above 200K}) OR ((income IN {50k-100k}) AND (clickHistory IN {Active})) OR (clickHistory IN {Very Active})) |

In the examples of FIGS. 14A and 14B, and FIG. 15, and FIG. 16, the AND/OR tree corresponding to the sample contract predicate SCP is constructed and annotated according to Algorithm 4, below.

| Algorithm 4: Tree Construction and Labeling |
|---|
| 1. Label the size of each node (e.g. using label n.size). See Algorithm 5, and the resulting FIG. 14A. |
| 2. Label the weight of each node (e.g. using label n.left.weight). See Algorithm 5, and the resulting FIG. 14B. |
| 3. Label the ordinal of each leaf node using recursive traversal (using n.ord). See FIG. 15. |
| 4. Label each node with {begin, end} using n.begin, and n.end. See Algorithm 6 and the resulting FIG. 16. |

Details of Step #1 and Step #2 of Algorithm 4 are further described in the following Algorithm 5.

| Algorithm 5: Bottom-Up Labeling for Size and Weight |
|---|
| 1 Label each leaf to be n.size = 1. |
| 2. Label the size of the parent of any child to become the sum of the sizes of the parent's children. |
| 3. For each child maintain total size of left siblings (n.left.weight) |
| 4. Continue labeling from child to parent (and recursively) up to and including the root of the tree |

One may observe that the sum label at any node is equal to the number of leafs (conjuncts) represented by that node. In this example, and in the representation as shown, the entire predicate expands to 16 conjuncts.

Figure 14A:
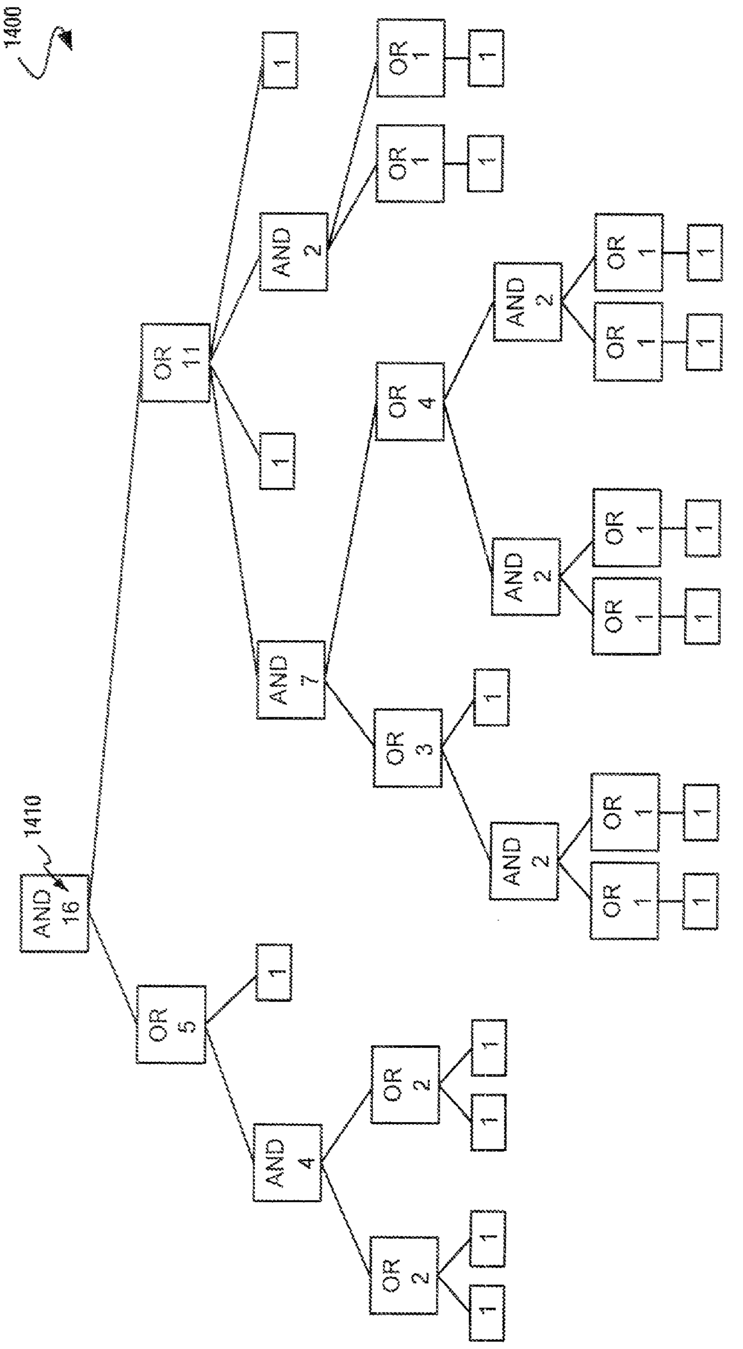
FIG. 14A is a depiction of a partially annotated AND/OR tree of a contract predicate, showing size labels, according to one embodiment.

FIG. 14A is a depiction of a partially annotated AND/OR tree of a contract predicate, showing size labels. As shown, the size-annotated tree 1400 comprises alternating AND/OR levels that correspond to the size-annotated alternating AND/OR construction of sample contract predicate SCP according to Step #1 and Step #2 of Algorithm 5. The n.size labels (e.g. 1410) are shown with each corresponding node.

Figure 14B:
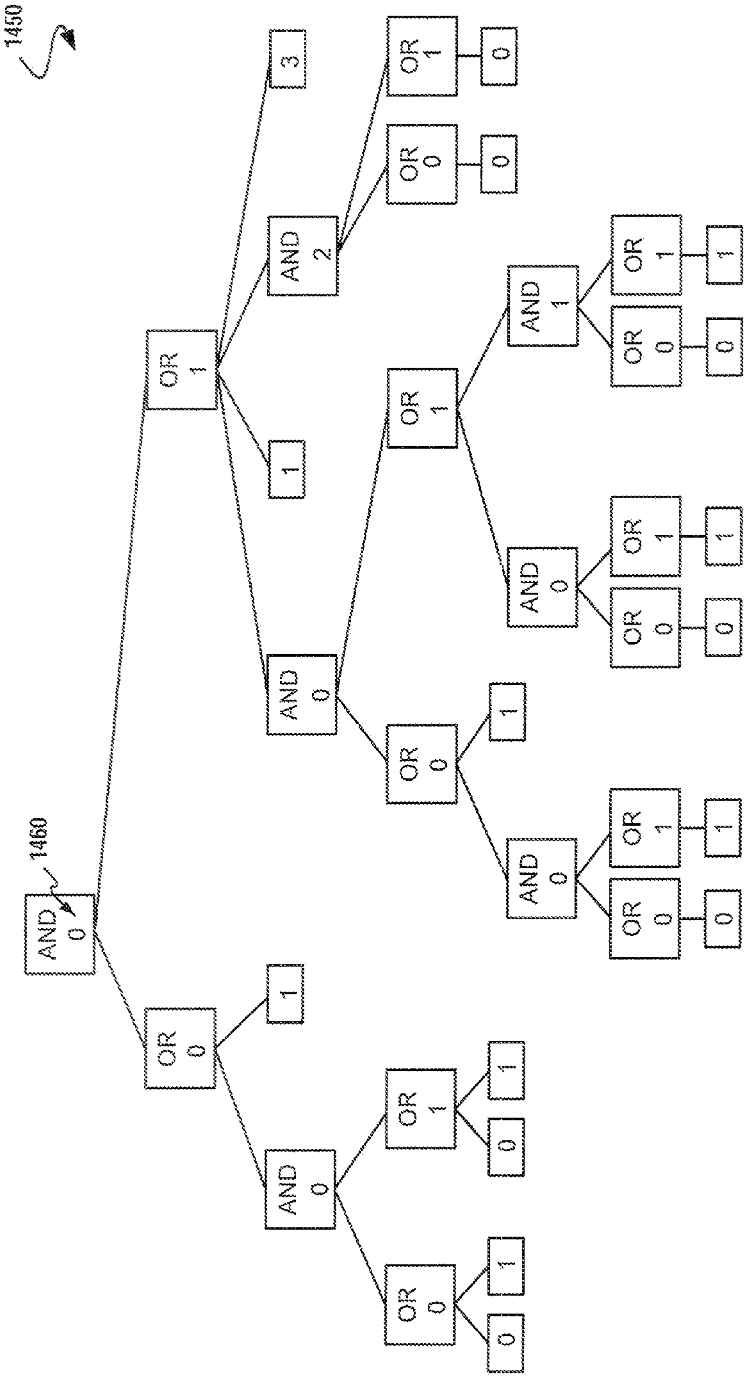
FIG. 14B is a depiction of a partially annotated AND/OR tree of a contract predicate, showing weight labels, according to one embodiment.

FIG. 14B is a depiction of a partially annotated AND/OR tree of a contract predicate, showing weight labels. As shown, the weight-annotated tree 1450 comprises alternating AND/OR levels that correspond to the weight-annotated alternating AND/OR construction of sample contract predicate SCP according to Step #3 and Step #4 of Algorithm 5. The n.left-.weight labels (e.g. 1460) are shown with each corresponding node.

Figure 15:
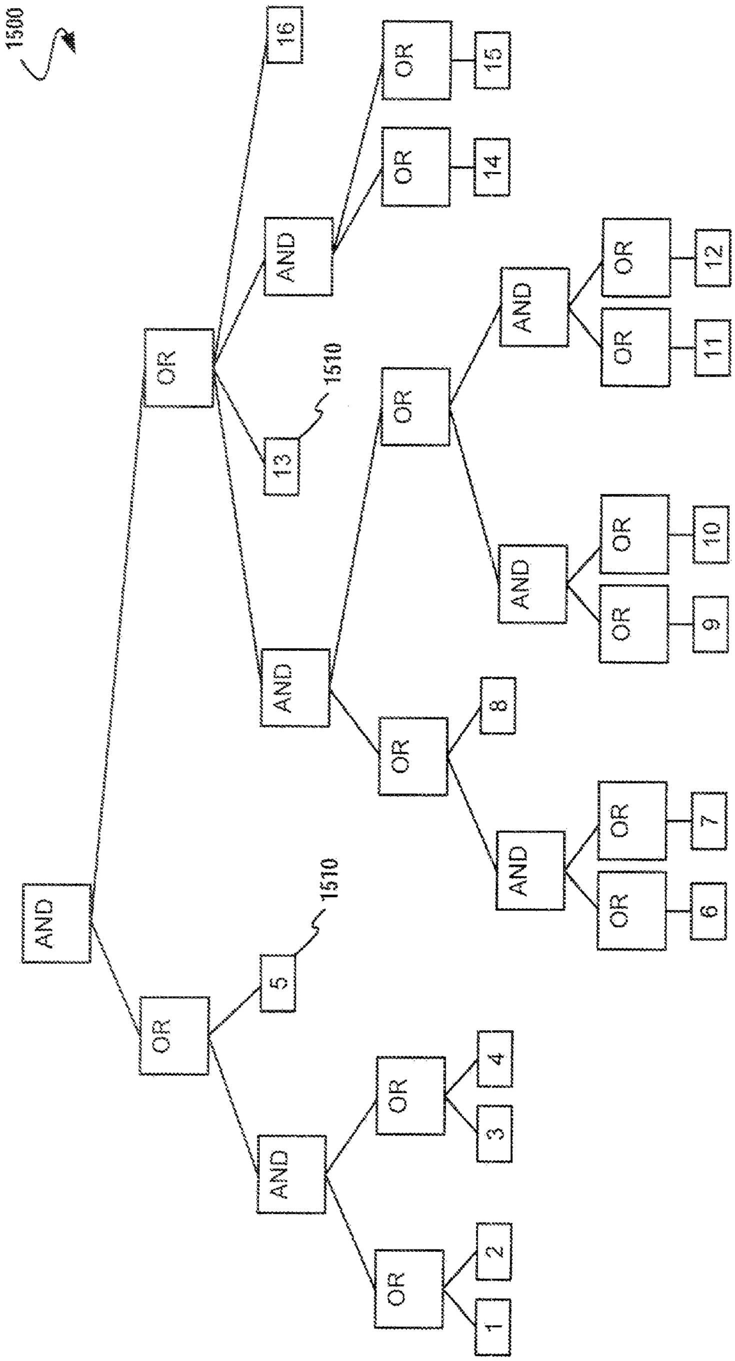
FIG. 15 is a depiction of a partially annotated AND/OR tree of a contract, showing ordinal labels, according to one embodiment.

FIG. 15 is a depiction of a partially annotated AND/OR tree of a contract, showing ordinal labels. As shown, the ordinal-annotated tree 1500 comprises alternating AND/OR levels that correspond to the ordinal-annotated alternating AND/OR construction of sample contract predicate SCP. Construction of this tree results in 16 leaf nodes, labeled according to Step #3 of Algorithm 4 and using integer labels 1-16 (e.g. 1510). The resulting tree has nodes labeled 1-16, corresponding to the listing below:

1: geo IN_THRESHOLD {Santa. Clara, Sunnyvale} {Confidence 50%}
2: geo IN_THRESHOLD {Palo Alto} {Confidence 60%}
3: geo IN_THRESHOLD (California) {Confidence 70%}
4: geo IN_THRESHOLD (West Coast) {Confidence 90%}
5: geo IN_THRESHOLD {New York} {Confidence 98%}
6: gender IN {Male}
7: topic NOT_IN {Sports, Finance}
8: topic IN {Life, Mortgage}
9: gender IN {Female}
10: topic NOT IN {Entertainment}
11: gender IN {Male, Female, Unknown}
12: topic IN_THRESHOLD (Banking) {Confidence 95%}
13: income IN {100 k-200 k, above 200K}
14: income IN {50 k-100 k}
15: clickHistory IN {Active}
16: clickHistory IN {Very Active}

Next, the details of the algorithm corresponding to Step #4 of Algorithm 4 (i.e. for assigning the {begin, end} using n.begin, and n.end values) are presented in Algorithm 6, below. Once a tree has been labeled according to Algorithm 6, the labeled tree exhibits the following characteristics:

Characteristic 1: Two nodes have an identical interval if and only if they are children of the same OR node.

Characteristic 2: The concatenation of all of the segments of all of the children of an AND node cover a contiguous segment.

Algorithm 6: Range Labeling

```
1:   Given: M
2:   Label root:{begin, end} = {1, M}
3:   If (n is an OR node)
4:            {
5:     foreach child c:
6:     c.begin = n.begin;
7:     c.end = n.end;
8:     }
9:   If (n is an AND node)
10:        {
11:        int curr = n.begin;
12:        for first child c
13:                {
14:                c.begin = n.begin
```

-continued

Algorithm 6: Range Labeling

```
                c.end = n.left.weight + c.size−1;
                curr += n.left.weight + c.size;
                }
        foreach intermediate child c
                {
                c.begin = curr;
                c.end = curr + c.size−1;
                curr += c.size;
                }
        for last child l
                {
                l.begin = curr;
                l.end = n.end;
                }
        }
```

Figure 16:
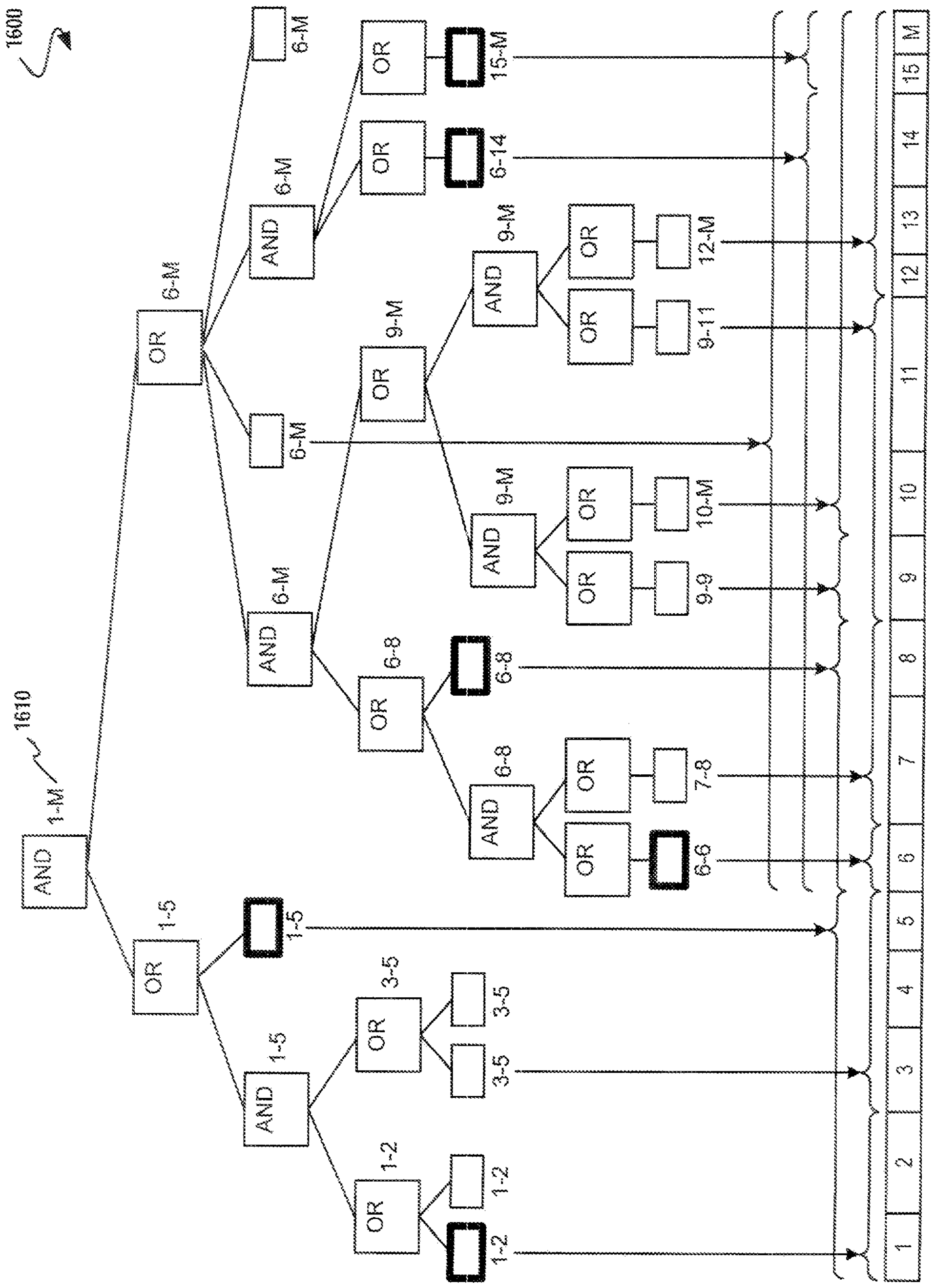
FIG. 16 is a depiction of a partially annotated AND/OR tree of a contract, showing projection labels, according to one embodiment.

FIG. 16 is a depiction of a partially annotated AND/OR tree of a contract, showing projection labels. As shown, the projection-annotated contract tree 1600 (one example of a fixed-length complex predicate representation) comprises alternating AND/OR levels which correspond to the projection-annotated alternating AND/OR construction of sample contract predicate SCP. The resulting projection-annotated tree is a representation of an exemplary contract, showing projection labels (e.g. 1610) assigned according to Algorithm 6.

A contract can be conceptualized as a set of discrete line segments from {0, 1, 2, . . . M}, where M is some maximum constant (e.g. 255). Each discrete line segment can be represented as a sequence of consecutive integers $N_0$ through $N_M$, where $N_{i+1}=N_i+1$, and $N_M$ is at most M. Each leaf node of the contract as represented in the form of FIG. 16 might be evaluated with respect to the conjuncts of the impression opportunity (see step 1250). Thus, for each leaf node that evaluates to TRUE against the conjunctions of the impression opportunity, the representation would present a projection into a segment of the discrete set (e.g. the segment described by {begin, end}). After evaluating all conjuncts for a given contract against the impression opportunity, the TRUE nodes (e.g. the nodes shown with a bold outline) are projected onto the number line (see step 1260). Contracts for which the projection of some subset of the TRUE conjuncts does project onto a partition of the discrete line from 0 to M are deemed as satisfied by the impression. That is, if there is a subset of the TRUE conjuncts for which the projections for this subset cover the discrete line from 0 to M with no overlap, then the contract is deemed as satisfied by the impression. In the case of multiple contracts being returned from the query and retrieval from the inverted index (see module 1230), each returned contract is processed according to step 1240, step 1250, and step 1260. Those contracts for which the projection of the TRUE conjuncts for the subject contract does project onto a contiguous segment are deemed as satisfied by the impression, and all such contracts are returned. It should be noted that using the labeled tree representation, a tree with N leaf nodes will require at most $\log_2(N)$ bits for each begin/end value, thus the detractions of label representations and label interpretations attendant to a Dewey number labeling scheme are overcome by embodiments of the present invention.

Many algorithms might be employed to accomplish the aforementioned projection. One such algorithm is presented below as Algorithm 7. Algorithm 7 is suited for implementation on a general purpose computer.

Algorithm 7: Projection of TRUE Nodes to Discrete Set

```
Given:
        {begin, end} IDs numbered as described above, sorted by
        begin.
        The minimum begin ID is 1, the maximum is M.
    Matched[ ] // bit array of length M+1, initialized to 0.
    Matched[0] = 1;
    foreach( {begin, end} )
        {
        if (matched(begin−1) == 1)
            {
            matched(end) = 1;
            }
        if (matched(M) == 1)
            {
            return true; // contract matched.
            }
        } // end for
    return false; // contract not matched.
```

Again referring to FIG. 16, the lower portion of FIG. 16 depicts a projection of the projection-annotated contract tree 1600 onto a contiguous discrete number line segment series. As earlier described, the projection-annotation of the leaf nodes is in accordance with using Algorithm 6, based on the sample impression of Table 17 above.

The projection of the TRUE conjuncts onto a discrete number line can be narrated as follows: Allocate a data structure Frontier to be a data structure for representing a discrete contiguous number line segment (i.e. a possible implementation of a discrete ordered set). Initialize Frontier to {0}. This data structure Frontier is initialized as {0} and for each conjunct being evaluated, a TRUE evaluation results in adding the segments (i.e. segments that are projected by a TRUE evaluation of a conjunct) to the Frontier data structure. For example, Table 18 below shows a running example based on the projection-annotated contract tree 1600 being evaluated against the sample impression of Table 17:

TABLE 18

Running example of sample impression of Table 17

| Conjunct Projection | Value of Frontier |
|---|---|
| {0} | Initial value = {0} |
| {1-2} | {0, 1, 2} |
| {1-5} | {0, 1, 2, 3, 4, 5} |
| {6-6} | {0, 1, 2, 3, 4, 5, 6}. |
| {6-8} | {0, 1, 2, 3, 4, 5, 6, 7, 8} |
| {6-14} | {0, 1, 2, 3, 4, 5, 6, 7, 8, 9, 10, 11, 12, 13, 14} |
| {15-M} | {0, 1, 2, 3, 4, 5, 6, 7, 8, 9, 10, 11, 12, 13, 14, 15, M} |

Note that even though 5 conjuncts (leaf nodes) are evaluated to TRUE (see the bolded leaf nodes and their projections), the sample impression and the sample contract are deemed to match. Those skilled in the art will recognize that it is not always necessary to evaluate all nodes in a projection tree, i.e. evaluation processing may stop when it is known that the projection of the evaluated conjuncts projects over the entire discrete symbol set.

As can be seen, this technique solves the problem indexing arbitrary Boolean expressions for efficient evaluation, yet overcomes size factors that become limiting as the size of Boolean expressions to be indexed increases. For instance, using this technique, and using just two bytes to represent each {begin, end} pair, Boolean trees with up to 256 leaf nodes can be indexed. Using four bytes to represent each {begin, end} pair, Boolean trees with up to 64 k (i.e. $2^8-1$) leaf nodes can be indexed. Moreover, this technique may be practiced using a very efficient evaluation algorithm that does not require the interpretation of Dewey ids.

In some embodiments, a system 150 might host a variety of modules to serve for automatic matching of contracts using a fixed-length complex predicate representation. For example, system 150 might include an impression and contract tree construction module 116 that cooperates with any other modules of system 150 to advantageously matching contracts using a fixed-length complex predicate representation, for example the matching and projection module 117.

Figure 17:
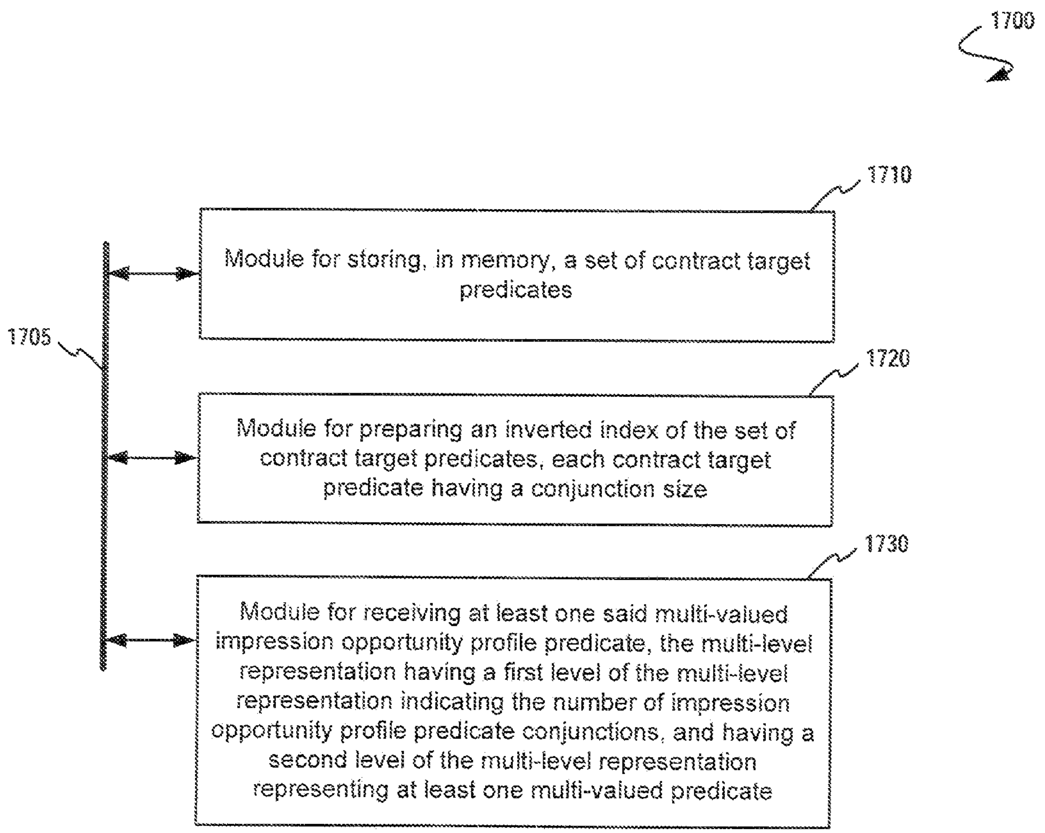
FIG. 17 depicts a block diagram of a system for matching to an advertising contract, according to one embodiment.

FIG. 17 depicts a block diagram of a system for matching to an advertising contract. As an option, the present system 1700 may be implemented in the context of the architecture and functionality of the embodiments described herein. Of course, however, the system 1700 or any operation therein may be carried out in any desired environment. As shown, system 1700 includes a plurality of modules, each connected to a communication link 1705, and any module can communicate with other modules over communication link 1705. The modules of the system can, individually or in combination, perform method steps within system 1700. Any method steps performed within system 1700 may be performed in any order unless as may be specified in the claims. As shown, system 1700 implements a method for matching to an advertising contract (e.g. 2D50), the system 1700 comprising modules for: storing, in memory, a set of contract target predicates (e.g. 610) (see module 1710); preparing an inverted index (e.g. 1000) of the set of contract target predicates, each contract target predicate having a conjunction size (see module 1720); receiving at least one the multi-valued impression opportunity profile predicate (e.g. 625) having a number of impression opportunity profile predicate conjunctions and preparing a multi-level representation (e.g. 600) of the multi-valued impression opportunity profile predicate, the multi-level representation having a first level (e.g. 620) of the multi-level representation indicating the number of impression opportunity profile predicate conjunctions, and having a second level (e.g. 630) of the multi-level representation representing at least one multi-valued predicate (see module 1730).

Figure 18:
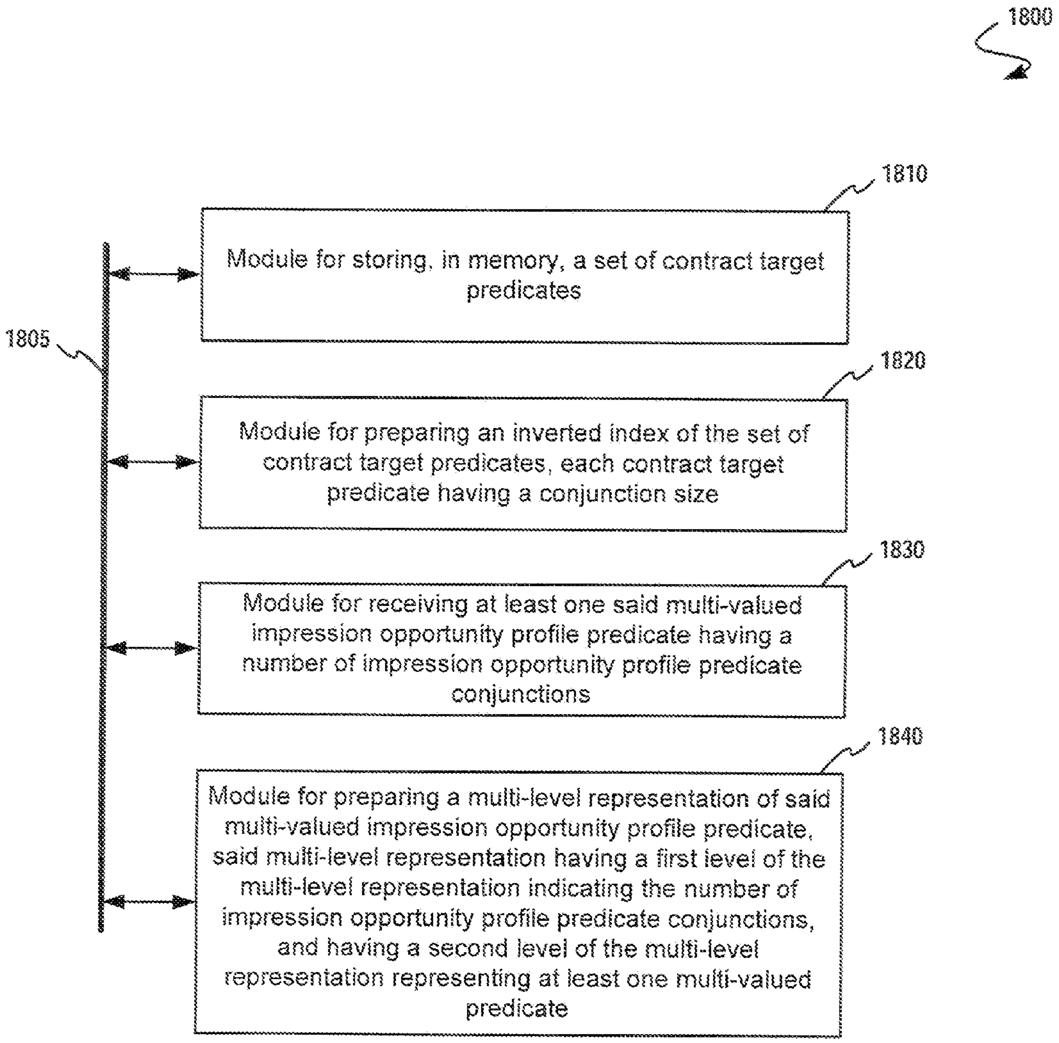
FIG. 18 depicts a block diagram of a system to perform certain functions of an ad server network, according to one embodiment.

FIG. 18 depicts a block diagram of a system to perform certain functions of an ad server network (e.g. 150). As an option, the present system 1800 may be implemented in the context of the architecture and functionality of the embodiments described herein. Of course, however, the system 1800 or any operation therein may be carried out in any desired environment. As shown, system 1800 comprises a plurality of modules including a processor and a memory, each module connected to a communication link 1805, and any module can communicate with other modules over communication link 1805. The modules of the system can, individually or in combination, perform method steps within system 1800. Any method steps performed within system 1800 may be performed in any order unless as may be specified in the claims. As shown, FIG. 18 implements an ad server network as a system 1800, comprising modules including a module for storing, in memory, a set of contract target predicates (see module 1810); a module for preparing an inverted index of the set of contract target predicates, each contract target predicate having a conjunction size (see module 1820); a module for receiving at least one the multi-valued impression opportunity profile predicate having a number of impression opportunity profile predicate conjunctions (see module 1830); and a module for preparing a multi-level representation of the multi-valued impression opportunity profile predicate, the multi-level representation having a first level of the multi-level representation indicating the number of impression opportunity profile predicate conjunctions, and having a second level of the multi-level representation representing at least one multi-valued predicate (see module 1840).

Figure 19:
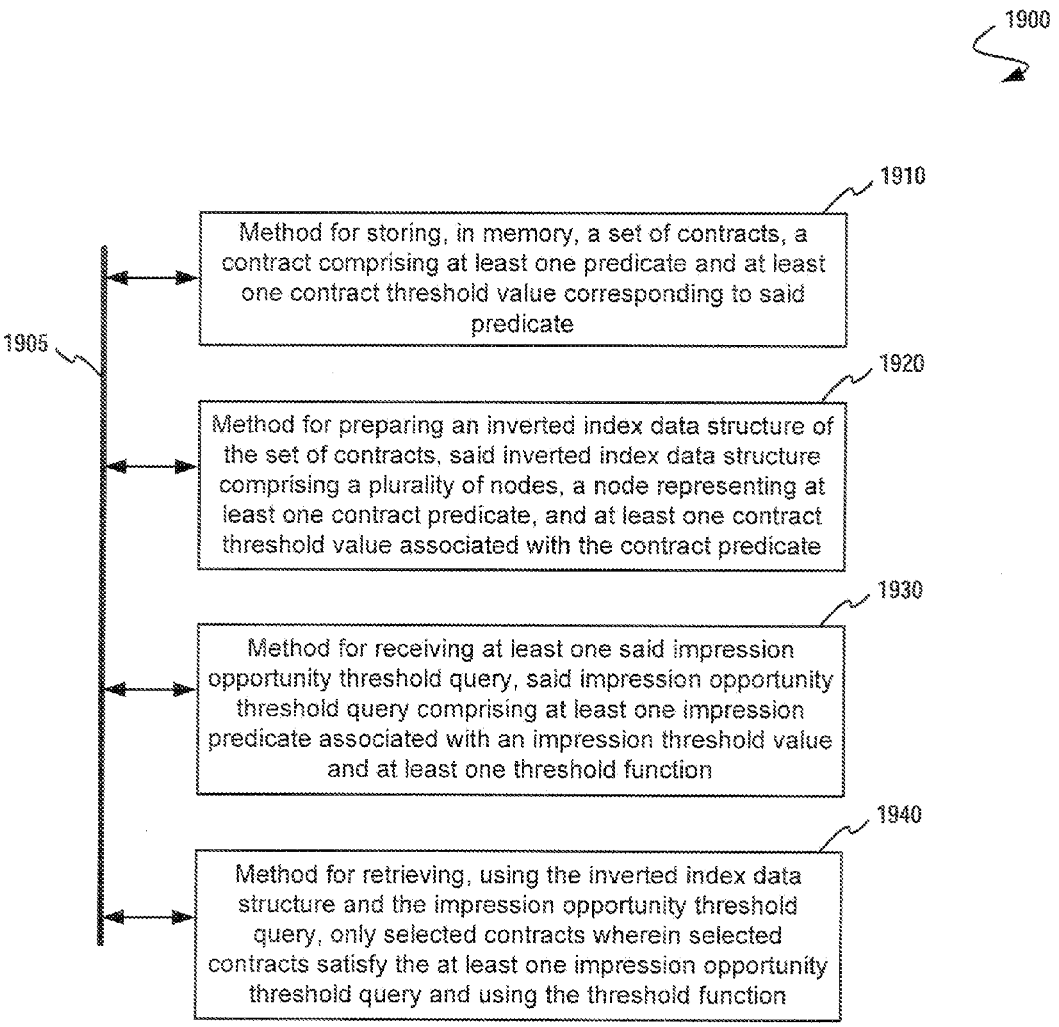
FIG. 19 depicts a block diagram of a system for matching to an impression opportunity profile predicate, according to one embodiment.

FIG. 19 depicts a block diagram of a system for matching to an impression opportunity profile predicate. As an option, the present system 1900 may be implemented in the context of the architecture and functionality of the embodiments described herein. Of course, however, the system 1900 or any operation therein may be carried out in any desired environment. As shown, system 1900 includes a plurality of modules, each connected to a communication link 1905, and any module can communicate with other modules over communication link 1905. The modules of the system can, individually or in combination, perform method steps within system 1900. Any method steps performed within system 1900 may be performed in any order unless as may be specified in the claims. As shown, system 1900 implements a method for matching to an impression opportunity profile predicate, the system 1900 comprising modules for: storing, in memory, a set of contracts, a contract comprising at least one predicate and at least one contract threshold value corresponding to the predicate (see module 1910); processing, in a processor, the contract by preparing an inverted index data structure of the set of contracts, the inverted index data structure comprising a plurality of nodes, a node representing at least one contract predicate, and at least one contract threshold value associated with the contract predicate (see module 1920); receiving at least one impression opportunity threshold query, the impression opportunity threshold query comprising at least one impression predicate associated with an impression threshold value and at least one threshold function (see module 1930); and retrieving, using the inverted index data structure and the impression opportunity threshold query, only selected contracts wherein selected contracts satisfy the at least one impression opportunity threshold query using a threshold function (see module 1940).

Figure 20:
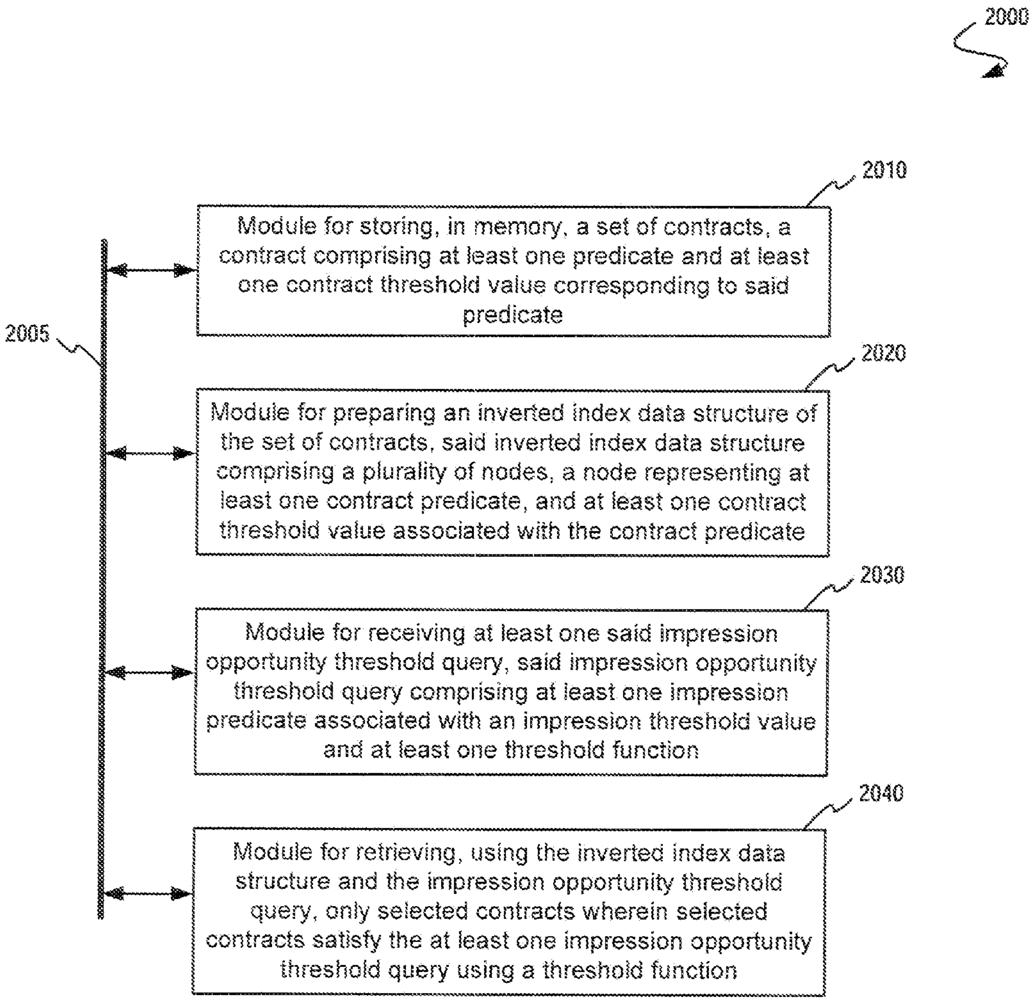
FIG. 20 depicts a block diagram of a system to perform certain functions of an ad server network, according to one embodiment.

FIG. 20 depicts a block diagram of a system to perform certain functions of an ad server network. As an option, the present system 2000 may be implemented in the context of the architecture and functionality of the embodiments described herein. Of course, however, the system 2000 or any operation therein may be carried out in any desired environment. As shown, system 2000 comprises a plurality of modules including a processor and a memory, each module connected to a communication link 2005, and any module can communicate with other modules over communication link 2005. The modules of the system can, individually or in combination, perform method steps within system 2000. Any method steps performed within system 2000 may be performed in any order unless as may be specified in the claims. As shown, FIG. 20 implements an ad server network as a system 2000, comprising modules including a module for storing, in memory, a set of contracts, a contract comprising at least one predicate and at least one contract threshold value corresponding to the predicate (see module 2010); a module for preparing an inverted index data structure of the set of contracts, the inverted index data structure comprising a plurality of nodes, a node representing at least one contract predicate, and at least one contract threshold value associated with the contract predicate (see module 2020); a module for receiving at least one impression opportunity threshold query, the impression opportunity threshold query comprising at least one impression predicate associated with an impression threshold value and at least one threshold function (see module 2030); and a module for retrieving, using the inverted index data structure and the impression opportunity threshold query, only selected contracts wherein selected contracts satisfy the at least one impression opportunity threshold query using a threshold function (see module 2040).

Figure 21:
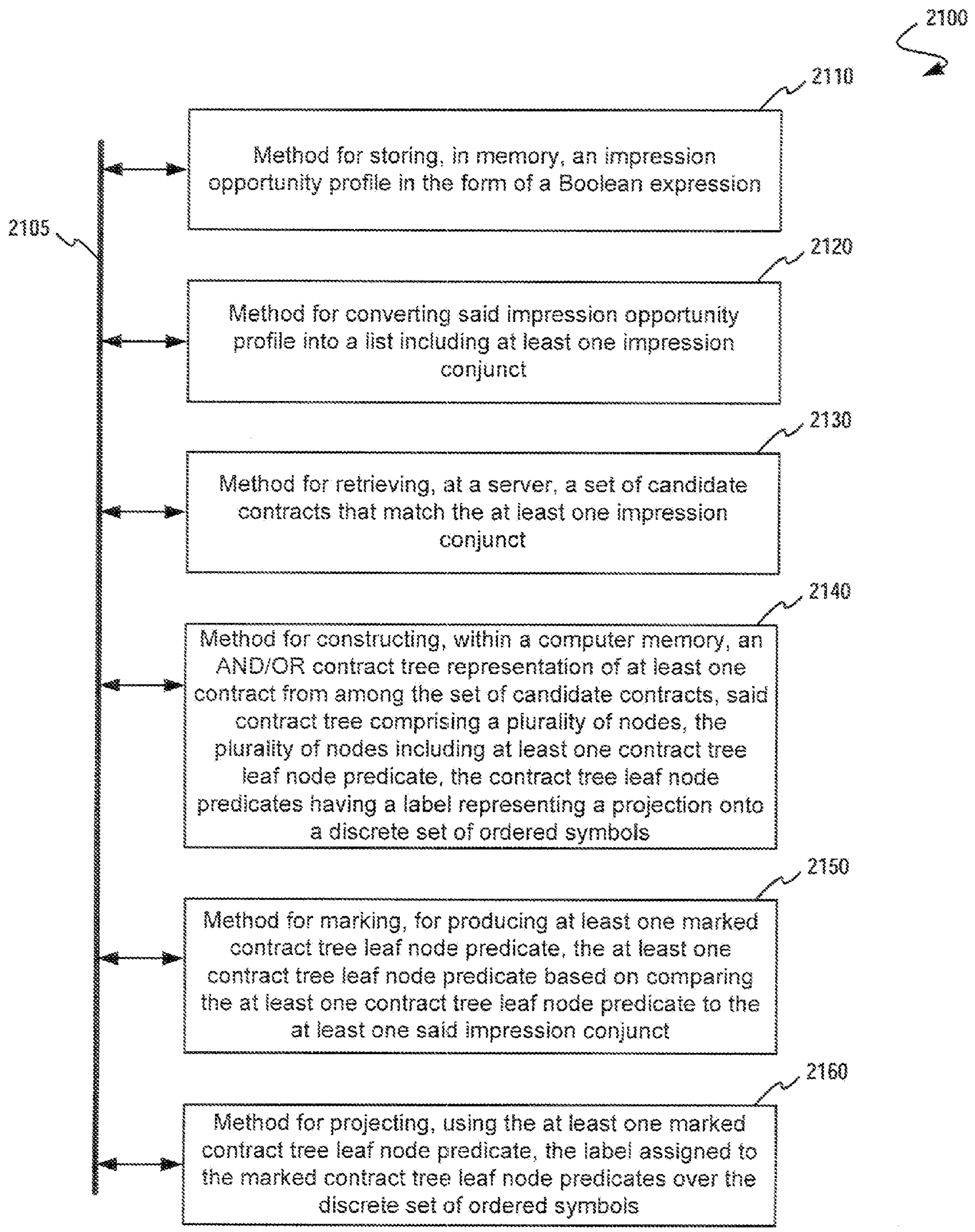
FIG. 21 depicts a block diagram of a system for matching of contracts using a fixed-length complex predicate representation, according to one embodiment.

FIG. 21 depicts a block diagram of a system for matching of contracts using a fixed-length complex predicate representation. As an option, the present system 2100 may be implemented in the context of the architecture and functionality of the embodiments described herein. Of course, however, the system 2100 or any operation therein may be carried out in any desired environment. As shown, system 2100 includes a plurality of modules, each connected to a communication link 2105, and any module can communicate with other modules over communication link 2105. The modules of the system can, individually or in combination, perform method steps within system 2100. Any method steps performed within system 2100 may be performed in any order unless as may be specified in the claims. As shown, system 2100 implements a method for matching of contracts using a fixed-length complex predicate representation, the system 2100 comprising modules for: storing, in memory, an impression opportunity profile in the form of a Boolean expression (see module 2110); converting the impression opportunity profile into a list including at least one impression conjunct (see module 2120); retrieving, at a server, a set of candidate contracts that match at least one impression conjunct (see module 2130); constructing, within a computer memory, an AND/OR contract tree representation of at least one contract from among the set of candidate contracts, the contract tree comprising a plurality of nodes, the plurality of nodes including at least one contract tree leaf node predicate, each contract tree leaf node predicate having a label representing a projection onto a discrete set of ordered symbols (see module 2140); marking (for producing at least one marked contract tree leaf node predicate) the at least one contract tree leaf node predicate based on comparing the at least one contract tree leaf node predicate to the at least one the impression conjunct (see module 2150); and projecting, using the at least one marked contract tree leaf node predicate, the label assigned to the marked contract tree leaf node predicates over the discrete set of ordered symbols (see module 2160). In some embodiments the method further comprises assembling a set of satisfying contracts (i.e. where the projecting results in a contiguous projection over the discrete set of ordered symbols), and returning the set of satisfying contracts to a requesting process or server.

Figure 22:
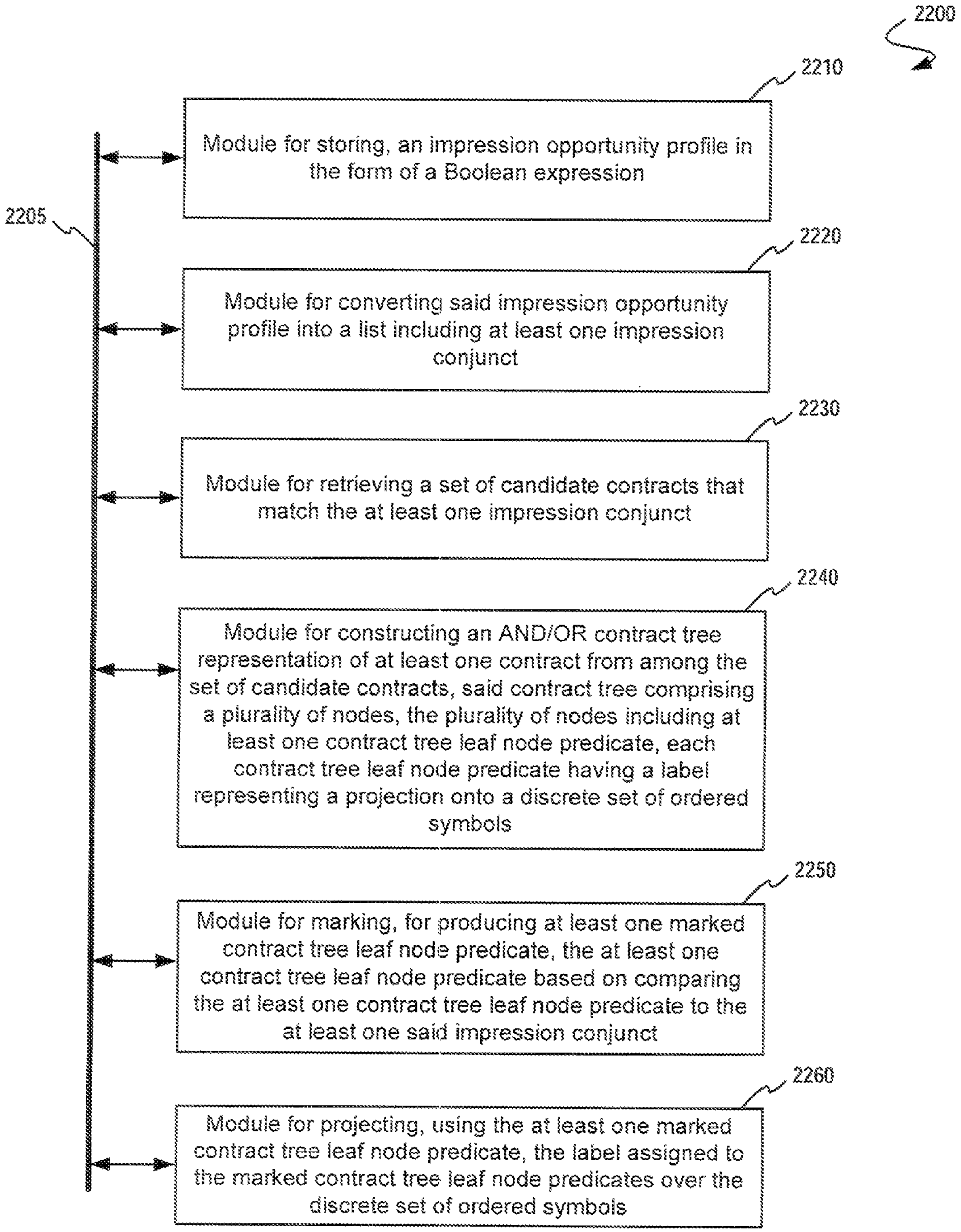
FIG. 22 depicts a block diagram of a system to perform certain functions of an ad server network, according to one embodiment.

FIG. 22 depicts a block diagram of a system to perform certain functions of an ad server network. As an option, the present system 2200 may be implemented in the context of the architecture and functionality of the embodiments described herein. Of course, however, the system 2200 or any operation therein may be carried out in any desired environment. As shown, system 2200 comprises a plurality of modules including a processor and a memory, each module connected to a communication link 2205, and any module can communicate with other modules over communication link 2205. The modules of the system can, individually or in combination, perform method steps within system 2200. Any method steps performed within system 2200 may be performed in any order unless as may be specified in the claims. As shown, FIG. 22 implements an ad server network as a system 2200, comprising modules including a module for storing, an impression opportunity profile in the form of a Boolean expression (see module 2210); a module for converting the impression opportunity profile into a list including at least one impression conjunct (see module 2220); a module for retrieving a set of candidate contracts that match the at least one impression conjunct (see module 2230); a module for constructing an AND/OR contract tree representation of at least one contract from among the set of candidate contracts, the contract tree comprising a plurality of nodes, the plurality of nodes including at least one contract tree leaf node predicate, each contract tree leaf node predicate having a label representing a projection onto a discrete set of ordered symbols (see module 2240); a module for marking (for producing at least one marked contract tree leaf node predicate) the at least one contract tree leaf node predicate based on comparing the at least one contract tree leaf node predicate to the at least one the impression conjunct (see module 2250); and a module for projecting, using the at least one marked contract tree leaf node predicate, the label assigned to the marked contract tree leaf node predicates over the discrete set of ordered symbols (see module 2260).

Section X: Detailed Description of Exemplary Embodiments

As used in the subject disclosure, the terms "annotate", "annotating", "label", "labeling", "mark", and "marking" all refer to the same concept of identifying an object as having a particular attribute. While the term "annotate" is convenient when discussing figures printed on pages, an art-specific term such as "marking" may be more convenient in discussion within the arts related to computer-implemented methods. As used in the subject disclosure, the terms "component" "system", "module", "processor", "memory" and the like are intended to refer to a computer-related entity, either hardware, software, software in execution, firmware, middleware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g. data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc. described with regard thereto, and are not limited to the precise configurations set forth in a given figure, as will be appreciated by one skilled in the art.

Figure 23:
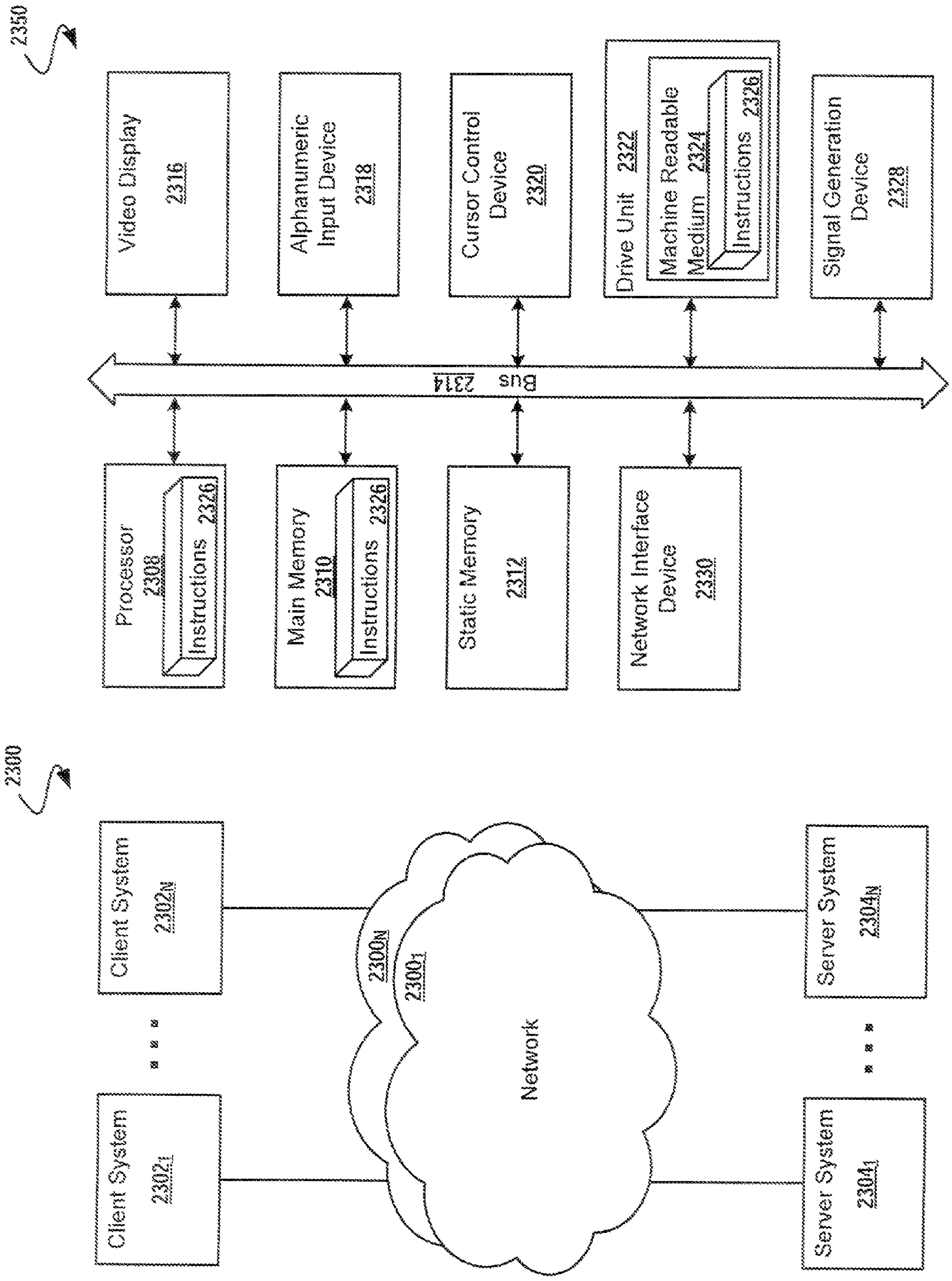
FIG. 23 is a diagrammatic representation of a network including nodes for client computer systems, nodes for server computer systems and nodes for network infrastructure, according to one embodiment.

FIG. 23 is a diagrammatic representation of a network 2300, including nodes for client computer systems $\mathbf{2302}_1$ through $\mathbf{2302}_N$, nodes for server computer systems $\mathbf{2304}_1$ through $\mathbf{2304}_N$, nodes for network infrastructure $\mathbf{2306}_1$ through $\mathbf{2306}_N$, any of which nodes may comprise a machine 2350 within which a set of instructions for causing the machine to perform any one of the techniques discussed above may be executed. The embodiment shown is purely exemplary, and might be implemented in the context of one or more of the figures herein.

Any node of the network 2300 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 2350 includes a processor 2308 (e.g. a processor core, a microprocessor, a computing device, etc), a main memory 2310 and a static memory 2312, which communicate with each other via a bus 2314. The machine 2350 may further include a display unit 2316 that may comprise a touch-screen, or a liquid crystal display (LCD), or a light emitting diode (LED) display, or a cathode ray tube (CRT). As shown, the computer system 2350 also includes a human input/output (I/O) device 2318 (e.g. a keyboard, an alphanumeric keypad, etc), a pointing device 2320 (e.g. a mouse, a touch screen, etc), a drive unit 2322 (e.g. a disk drive unit, a CD/DVD drive, a tangible computer readable removable media drive, an SSD storage device, etc), a signal generation device 2328 (e.g. a speaker, an audio output, etc), and a network interface device 2330 (e.g. an Ethernet interface, a wired network interface, a wireless network interface, a propagated signal interface, etc).

The drive unit 2322 includes a machine-readable medium 2324 on which is stored a set of instructions (i.e. software, firmware, middleware, etc) 2326 embodying any one, or all, of the methodologies described above. The set of instructions 2326 is also shown to reside, completely or at least partially, within the main memory 2310 and/or within the processor 2308. The set of instructions 2326 may further be transmitted or received via the network interface device 2330 over the network bus 2314.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for matching of contracts using a fixed-length complex predicate representation comprising:

storing, in memory, an impression opportunity profile in the form of a Boolean expression;

converting the impression opportunity profile into a list comprising at least one impression conjunct;

retrieving, at a server, a set of candidate contracts that match the at least one impression conjunct;

constructing, within a computer memory, a contract tree representation of at least one contract from among the set of candidate contracts, the contract tree comprising alternating AND/OR levels of a plurality of nodes, the plurality of nodes comprising at least one contract tree leaf node predicate, the contract tree leaf node predicates having a label representing a projection onto a discrete set of ordered symbols; and marking, for producing at least one marked contract tree leaf node predicate, the at least one contract tree leaf node predicate based on comparing the at least one contract tree leaf node predicate to the at least one impression conjunct.

2. The method of claim 1, further comprising assembling a set of satisfying contracts where the projecting results in a contiguous projection over the discrete set of ordered symbols.

3. The method of claim 1, wherein the retrieving includes using an inverted index of contracts.

4. The method of claim 1, wherein the at least one of the set of candidate contracts includes a pair of numbers for representing a position in the inverted index of contracts.

5. The method of claim 1, wherein the inverted index of contracts includes a weighting coefficient corresponding to at least one contract tree leaf node predicate.

6. The method of claim 1, wherein the inverted index of contracts includes making posting lists of contracts for IN predicates.

7. The method of claim 1, wherein the impression opportunity profile in the form of a Boolean expression is specified comprising a disjunctive normal form representation.

8. The method of claim 1, wherein the impression opportunity profile in the form of a Boolean expression is specified comprising a conjunctive normal form representation.

9. The method of claim 1, wherein the impression opportunity profile in the form of a Boolean expression is specified comprising a vector of feature-value pairs.

10. The method of claim 1, wherein the inverted index of contracts includes an upper bound weight.

11. The method of claim 1, wherein the inverted index of contracts includes making posting lists of contracts for NOT-IN predicates.

12. The method of claim 1, wherein the retrieving operation retrieves a set containing only the top N weighted contracts.

13. The method of claim 1, wherein the retrieving operation prunes contracts containing any NOT-IN predicates violated by the impression opportunity profile.

14. An ad server network for matching of contracts using a fixed-length complex predicate representation comprising:

a memory to store an impression opportunity profile in the form of a Boolean expression;

a processing unit to convert the impression opportunity profile into a list comprising at least one impression conjunct;

a module to retrieve a set of candidate contracts that match the at least one impression conjunct;

a module to construct a contract tree representation of at least one contract from among the set of candidate contracts, the contract tree comprising alternating AND/OR levels of a plurality of nodes, the plurality of nodes comprising at least one contract tree leaf node predicate, each contract tree leaf node predicate having a label representing a projection onto a discrete set of ordered symbols; and a module to produce at least one marked contract tree leaf node predicate, the at least one contract tree leaf node predicate based on comparing the at least one contract tree leaf node predicate to the at least one impression conjunct.

15. The ad server network of claim 14, further comprising assembling a set of satisfying contracts where the projecting results in a contiguous projection over the discrete set of ordered symbols.

16. The ad server network of claim 14, wherein the retrieving includes using an inverted index of contracts.

17. The ad server network of claim 16, wherein the inverted index of contracts includes posting lists of contracts for IN predicates.

18. The ad server network of claim 14, wherein the set of candidate contracts containing only top N weighted contracts.

19. The ad server network of claim 14, wherein the at least one of the set of candidate contracts includes a pair of numbers for representing a position of the at least one of the set of selected contracts in an index.

20. The ad server network of claim 14, wherein the impression opportunity profile includes a description containing at least one of, disjunctive normal form representation, conjunctive normal form representation.

* * * * *